US012777307B2

(12) United States Patent
Start

(10) Patent No.: US 12,777,307 B2
(45) Date of Patent: Oct. 27, 2026

(54) METHOD AND DEVICE FOR FILLING AT LEAST ONE PUBLIC AREA WITH SOUND

(71) Applicant: HOLOPLOT GmbH, Berlin (DE)

(72) Inventor: Evert W. Start, Zeist (NL)

(73) Assignee: Holoplot GmbH, Berlin (DE)

( * ) Notice: Subject to any disclaimer, the term of this patent is extended or adjusted under 35 U.S.C. 154(b) by 316 days.

(21) Appl. No.: 18/577,505

(22) PCT Filed: Jul. 7, 2022

(86) PCT No.: PCT/EP2022/068913
§ 371 (c)(1),
(2) Date: Nov. 20, 2024

(87) PCT Pub. No.: WO2023/280982
PCT Pub. Date: Jan. 12, 2023

(65) Prior Publication Data

US 2025/0330771 A1 Oct. 23, 2025

(30) Foreign Application Priority Data

Jul. 9, 2021 (DE) ..................... 10 2021 207 302.6

(51) Int. Cl.
*H04S 7/00* (2006.01)
*H04R 5/02* (2006.01)
*H04R 27/00* (2006.01)

(52) U.S. Cl.
CPC ............... *H04S 7/308* (2013.01); *H04R 5/02* (2013.01); *H04R 27/00* (2013.01); *H04S 2400/11* (2013.01); *H04S 2420/13* (2013.01)

(58) Field of Classification Search
CPC .......... H04R 1/403; H04R 5/02; H04R 27/00; H04R 2201/401; H04S 7/308; H04S 7/30; H04S 2400/11; H04S 2420/13
(Continued)

(56) References Cited

U.S. PATENT DOCUMENTS

2009/0110219 A1* 4/2009 Kushida .................. H04S 3/002
381/303
2016/0157010 A1 6/2016 Oellers et al.
(Continued)

FOREIGN PATENT DOCUMENTS

DE 102009006762 A1 8/2010
DE 102019208631 A1 12/2020
(Continued)

OTHER PUBLICATIONS

Hashimoto, et al., "Sound Propagation Direction Control Using Three Configurations of Two-Dimensional Loudspeaker Arrays", EUSIPCO, Aug. 23-27, 2010, 5 pages.
(Continued)

*Primary Examiner* — Paul Kim
(74) *Attorney, Agent, or Firm* — Sterne, Kessler, Goldstein & Fox P.L.L.C.

(57) ABSTRACT

Provided is a method for filling at least one public area with sound by at least one sound transducer arrangement with a plurality of sound transducers, wherein the individual sound transducers of the at least one sound transducer arrangement each emit elementary waves, which are superimposed to form a common wavefront, wherein
the at least one sound transducer arrangement and the at least one public area are geometrically linked with each other by a coordinate system, and
a spatial allocation exists between the physical positions of the individual sound transducers in the at least one sound transducer arrangement and position vectors $s_i$ for defining coordinates in the area of the at least one sound transducer arrangement, and furthermore
there exists an allocation of points of the coordinate system to points in the at least one public area corresponding to a position vector.

28 Claims, 9 Drawing Sheets

(58) Field of Classification Search
USPC .......................................................... 381/303
See application file for complete search history.

(56) References Cited

U.S. PATENT DOCUMENTS

| | | | | |
|---|---|---|---|---|
| 2016/0192103 | A1* | 6/2016 | Oellers | H04S 3/02 381/303 |
| 2016/0205474 | A1 | 7/2016 | Oellers et al. | |
| 2021/0204085 | A1 | 7/2021 | Claar | |

FOREIGN PATENT DOCUMENTS

| | | | |
|---|---|---|---|
| EP | 3183891 | B1 | 10/2018 |
| JP | 2009231980 | A | 10/2009 |
| JP | 2012235426 | A | 11/2012 |
| JP | 201313129 | A | 1/2013 |
| WO | 2015004526 | A2 | 1/2015 |
| WO | 2015022579 | A2 | 2/2015 |
| WO | 2015036845 | A1 | 3/2015 |

OTHER PUBLICATIONS

First Official Notification regarding Notice of Opposition issued in Application No. 22741503.1, Mar. 24, 2026, 19 pages.
Second Official Notification regarding Notice of Opposition issued in Application No. 22741503.1, Mar. 30, 2026, 1 page.
Ahrens, "The Single-layer Potential Approach Applied to Sound Field Synthesis Including Cases of Non-enclosing Distributions of Secondary Sources", Technische Universitat Berlin, 2010, 151 pages.
Berkhout, "A Holographic Approach to Acoustic Control", J. Audio Eng. Soc., 1988, pp. 977-995, vol. 36:12.

* cited by examiner

METHOD AND DEVICE FOR FILLING AT LEAST ONE PUBLIC AREA WITH SOUND

CROSS REFERENCE TO RELATED APPLICATIONS

This application is the United States national phase of International Patent Application No. PCT/EP2022/068913 filed Jul. 7, 2022, and claims priority to German Patent Application No. 10 2021 207 302.6 filed Jul. 9, 2021, the disclosures of which are hereby incorporated by reference in their entireties.

BACKGROUND

Technical Field

This disclosure relates to a method for filling a public area with sound, a method for determining delay times ti for operating sound transducers, a computer program product and a device for filling at least one public area with sound with the.

Technical Considerations

According to the principle of wave field synthesis (A. J. Berkhout, A Holographic Approach to Acoustic Control, J. Audio Eng. Soc, Vol. 36, No. 12, 1988), a plurality of sound transducers generates a wavefront which supplies a given public area with a very uniform level in a high audio quality, without too much irradiating adjacent reflection surfaces in an undesired way.

The growing dimension of the public areas of large events involves an increase of the requirements of the sound systems. The differences in sound pressure between the individual spectator seats often cannot be tolerated when the sound waves are emitted in a less directional manner; playback, frequency response and speech intelligibility suffer due to a drop in level, airborne sound insulation and undesired reflections.

For this reason, loudspeaker arrangements consisting of several individual sound sources direct the sound more strongly into the more distant public areas. A typical application includes so-called line arrays, which e.g. are arranged on the left and right sides above a stage front. Their curvature is adjusted to the public area in such a way that the emitted wave front in the elevation plane is aligned with the more distant public areas. There is almost generated a cylindrical wave around this part of the loudspeaker arrangement.

The surface of a cylinder grows linearly with its radius, which is why the sound pressure decreases by 3 decibels with each doubling of the distance.

In the lower area of the sound transducer arrangement, the stronger curvature of the transducer surfaces results in a larger vertical opening angle. In this area, the wavefront almost is a spherical sector. The surface of a sphere quadratically growing with the radius here results in a sound pressure drop in the amount of 6 dB with each doubling of the distance. Due to the rapid drop in sound pressure at close range and the farther-reaching cylindrical wave for the distant seats, the differences in sound pressure between the front and rear public areas are reduced distinctly.

In recent years, there have also been used sound lines with an electronic actuation of the individual sound transducers. Each sound transducer has its own amplifier, which is actuated by a signal processor. Mathematical methods permit an emission adapted to the public area significantly better than would be possible with the mechanical alignment of individual sound transducers. Corresponding to the Huygens principle, the curvature of the sound transducer arrangement can be simulated with small delays in the actuation of the individual transducers and be adapted electronically. With the available sound lines, however, these possibilities are limited to the elevation plane.

Because the directional characteristic can be adapted only in the elevation plane even with this improved radiation, the sound field remains only roughly tailored to the given public area. In the azimuth plane, the radiation is given only by the mechanical alignment of the loudspeaker group. Adaptation to the public area here is at best possible by the selection of loudspeaker elements with a broader or narrower horizontal directional characteristic.

What is distinctly more flexible are loudspeaker fields as they are available for audio playback according to the principle of the wave field synthesis (such as for example in WO 2015/036 845 A1). Here, each sound transducer is operated at a separate power amplifier. Corresponding to the Huygens principle, a wavefront is composed of the superposition of the elementary waves of each individual sound transducer, which reconstructs a spherical sector of the wavefront of a real sound source. The virtual sound source of the wave field synthesis is the center of this spherical sector. The boundaries of the spherical sector are determined by the size of the sound transducer field in conjunction with the position of the virtual sound source.

SUMMARY

The objective of the proposed solution is a method for filling a public area with sound by a sound transducer arrangement which effects an improved adaptation of the emission characteristic to the public area.

The proposed solution relates to a method for filling at least one public area with sound by a sound transducer arrangement comprising a plurality of sound transducers. The individual sound transducers of the at least one sound transducer arrangement—in operation—emit elementary waves which are superimposed to form a common wavefront. Whenever reference is made below to the emission of elementary waves from the sound transducers, the acoustic center of the sound transducers is meant.

The at least one sound transducer arrangement and the public area are associated to a common coordinate system, in particular to a Cartesian coordinate system.

As will become clear in the following, the coordinate system on the side of the at least one sound transducer arrangement in particular serves to determine starting points for position vectors $s_i$, which together with direction vectors $r_i$ determine the emission of the sound from the at least one sound transducer arrangement. The coordinate system thus combines the at least one sound transducer arrangement and the at least one public area.

A spatial allocation exists between the position vectors $s_i$ and the physical positions of the sound transducers. In the simplest case, the acoustic centers of the sound transducers are located at the point of origin of the position vectors $s_i$. It is also possible, however, that the sound transducers do not lie exactly on the points of origin of the position vectors $s_i$. As far as the positions of the acoustic centers of the sound transducers deviate from the crossing points of the auxiliary grid, the related change of delay time and level can be corrected by spatial interpolation or other methods. The position vectors $s_i$ can be stored e.g. in the form of a list.

Due to the introduction of the coordinate system, points in the public area and points on the at least one sound transducer arrangement—and hence indirectly also the sound transducers themselves—can simply be geometrically related to each other, such as in the calculation of a distance of a sound transducer to a point in the public area.

The method proceeds from an allocation of points of the coordinate system to points in at least one public area and correspondingly allocates a position vector $r_i$. The position vector $r_i$ thus points on a particular place in the public area 3.

From the position vectors $s_i$, from which indirectly or also directly the positions of the individual sound transducers can be determined, direction vectors, in particular normalized direction vectors $$\hat{d}_i = \frac{r_i - s_i}{|r_i - s_i|},$$

can be determined, and the emission direction of the wavefront in the region of the respective sound transducers can be determined.

In dependence on the spatial allocation of the position vectors $s_i$ and the sound transducers delay times $\tau_j$ now are determined for the sound transducers, with which acoustic elementary waves then are emitted. The delay times $\tau_j$ of the sound transducers each are chosen such that the local direction of the common wavefront corresponds to the direction of the direction vector, in particular of the normalized direction vector $\hat{d}_i$.

The sound transducers of the at least one sound transducer arrangement thus are each operated with a particular delay time $\tau_j$. The delay time $\tau_j$ of a sound transducer determines the time of generation of an elementary wave at the respective sound transducer. In particular, the delay times $\tau_j$ of the individual sound transducers with respect to the input signal can be determined. In other words, an individual delay time $\tau_j$ is assigned to each sound transducer. The delay times of the individual sound transducers can differ in principle, but some sound transducers can also be operated with the same delay time $\tau_j$.

The entirety of the delay times with which the individual sound transducers of the sound transducer arrangement are operated influences the shape of the common wavefront, which is composed of the elementary waves generated by the individual sound transducers. In particular, the shape of the common wavefront can be determinable by the entirety of the delay times $\tau_j$.

In particular, by particular choices of the delay times t wavefronts of complex shape can be generated. As a result, different delay times $\tau_j$ in the sound transducer arrangement provide a correspondingly shaped wavefront, e.g. with different curvatures. The wavefront formed by the elementary waves thus no longer is a spherical sector, as it is generated by a virtual sound source with a two-dimensional wave field synthesis sound transducer arrangement. Depending on the shape and size of the coverage area (i.e. of the at least one public area), stronger curvatures and and areas of flatter curvature are obtained. In the direction of the distant spectator seats, the convex curvature of the wavefront mostly is smaller, a stronger curvature in the direction of the front spectator seats makes the sound pressure level drop more quickly with increasing distance and distributes the energy on a larger spectator area.

The delay times $\tau_j$ of the individual sound transducers can be determined in such a way that the common wavefront adapts to the geometry of the public area. In particular, the local directions of the wavefront are controlled by the delay times $\tau_j$. Due to the resulting irregularly shaped wavefront, the same number of grid points (i.e. of the coordinate system in the region of the sound transducer arrangement) of the sound transducer arrangement and thus also of sound transducers in principle is associated to the same size of the public area. In this respect, such a wavefront fundamentally differs from the spherical sector of a point-shaped virtual sound source of the wave field synthesis, in which the spectator area supplied by the same number of sound transducers steadily rises with increasing distance.

The local direction of the common wavefront at a position on the wavefront each describes the direction in which the common wavefront propagates at the respective position. The local direction of the common wavefront can each be described by the direction vector which at the respective point is perpendicular to the common wavefront. The direction vector describes a local propagation direction of the common wavefront, when the wavefront moves perpendicularly to the direction vector.

An adaptation of the common wavefront to the geometry of the at least one public area becomes possible by a determinable allocation, which allocates one position each in the public area corresponding to a position vector $r_i$ to the position vectors $s_i$ (which e.g. can be allocated to individual sound transducers). The respective allocation results in normalized direction vectors $$\hat{d}_i = \frac{r_i - s_i}{|r_i - s_i|}.$$

The delay times $\tau_j$ then are each chosen such that the local direction of the common wavefront at the position in the public area, which is described by the position vector $r_i$, corresponds to the direction of the direction vector $\hat{d}_i$. In particular, local propagation directions of the common wavefront are given by the normalized direction vectors $\hat{d}_i$.

The sound transducers of the at least one sound transducer arrangement can be arranged on or in a plane. Alternatively, the sound transducers of the sound transducer arrangement can be arranged on or in an at least partly curved surface. The arrangement can be grid-like, for example. In particular, the distances of the sound transducers to each other can be uniform. For example, the distances in a first direction, in particular in a vertical direction, and/or the distances in a second direction, in particular in a horizontal direction, can each correspond to each other or form a regular sequence of distance quantities. The geometrical shape, in or on which the sound transducers are arranged, can be complex. The sound transducers can lie e.g. in an area in a planar surface, wherein other sound transducers of the same sound transducer arrangement lie on a curved surface. The different parts of the surface also can have different radii of curvature.

Alternatively, the sound transducers of the at least one sound transducer arrangement are arranged in a three-dimensional area, in particular in a space. The arrangement of the individual sound transducers can be determinable proceeding from a reference surface, for example a plane or a curved surface, wherein at least a partial quantity of the sound transducers of the at least one sound transducer arrangement is arranged on the reference surface and the positions of the remaining sound transducers of the at least one sound transducer arrangement can be determined by a spatial offset into the three-dimensional area.

The operation of the sound transducer-which is associated to the position vector $s_i$—with the delay time $\tau_j$ can each be effected by an actuation by means of a computer system. In particular, the actuation with the delay time $\tau_j$ can be digitally influenced or be effected by a digital actuation. The delay times can lie in the order of milliseconds. For adjacent sound transducers the time difference mostly is a few microseconds so that the entire system needs a very stable system clock.

Additionally or alternatively, the delay time with which a sound transducer is operated can be influenced mechanically or geometrically. For example, the delay time of a sound transducer can be controlled by means of a spatial offset, in particular in the emission direction of the sound transducer arrangement, with respect to other sound transducers of the sound transducer arrangement.

The public area can at least partly have a planar or concave shape and/or at least partly a convex shape. The public area can be described as a coherent surface or as an uncoherent surface, consisting of at least two coherent parts. An example for a public area composed of several areas is the great hall of the Berlin Philharmonic or an opera hall with several levels. The public area can, however, also be represented by an amount of coordinate points.

In the coordinate system, the position vectors $s_i$ which are associated to the sound transducers of the sound transducer arrangement can form a regular grid.

Additionally or alternatively, the position vectors $r_i$ can form a regular grid on the reference surface R associated to the public area.

The allocation, which assigns a point in the public area corresponding to the position vector $r_i$ to each position vector $r_i$ in the sound transducer array, can be determinable by means of connecting lines from the sound transducer arrangement into the public area. In particular, the connecting line can be formed as a half-straight line proceeding from the position vector $s_i$, which intersects the public area or the reference surface R associated to the public area. Then, a position vector $r_i$ can be associated to the sound transducer, which results from the point of intersection of the half-straight line with the public area or the reference surface R associated to the public area.

Additionally or alternatively, the levels with which the sound transducers of the at least one sound transducer arrangement are operated can be determinable by means of a relative amplification factor, in particular based on the rule $\hat{d}_n=\hat{d}_i \cdot n_i$, wherein $n_i$ each describes the normal to the reference surface S at the position vector $s_i$.

By operating the sound transducers according to the relative amplification factors $\hat{d}_n$ it is ensured that the sound pressure level at the receiver position $r_i$ is independent of the angle of the direction vector $d_i$ to the normal $n_i$. As a result, a homogeneous noise level can be ensured in the public area to be filled with sound.

Furthermore, the proposed solution relates to a method for determining delay times $\tau_j$ for a sound transducer arrangement with a plurality of sound transducers j for generating elementary waves according to the delay times $\tau_j$ for filling at least one public area with sound.

The method comprises the steps of determining a coordinate system by which the at least one sound transducer arrangement is approximately described as a reference surface S and the public area is approximately described as a reference surface R; the determination of position vectors s on the reference surface S of the at least one sound transducer arrangement, from which the positions of the sound transducers of the at least one sound transducer arrangement can be determined; the determination of normalized direction vectors $\hat{d}$ proceeding from the position vectors s, wherein the normalized direction vectors $\hat{d}$ are directed to the reference surface R of the public area and the determination of delay times $\tau_j$ for sound transducers j, so that the elementary waves of the sound transducers of the sound transducer arrangement are superimposed in operation according to the delay times $\tau_j$ to form a common wavefront, wherein the normalized direction vectors $\hat{d}$ describe local propagation directions of the common wavefront.

In other words, the common wavefront propagates substantially perpendicularly to the normalized direction vectors $\hat{d}$. In this way, the normalized direction vectors $\hat{d}$ describe the course of propagation of the common wavefront. In particular, the common wavefront can be adapted to the geometry of the public area by a suitable choice of the normalized direction vectors $\hat{d}$.

For an adaptation of the sound levels, the relative amplification factors $\hat{d}_n$ can be determined for at least a partial quantity of the position vectors s according to the rule $$\hat{d}_n = \hat{d} \cdot n$$

wherein n is a normal to the reference surface S of the sound transducer arrangement at the point determined by the position vector s and $\hat{d}$ is the normalized direction vector proceeding from the position vector s.

The position vectors s can wholly or partly correspond to the positions of the sound transducers on the sound transducer arrangement, and in any case a spatial allocation exists between the physical positions of the individual sound transducers in the at least one sound transducer arrangement and the position vectors $s_i$ for defining coordinates in the region of the at least one sound transducer arrangement.

The number of the position vectors s can correspond to the number of sound transducers of the sound transducer arrangement or can also be different of the same. In particular, the number of the position vectors s can be higher than the number of sound transducers on the sound transducer arrangement.

The position vectors s can describe crossing points of an auxiliary grid described on the reference surface S of the at least one sound transducer arrangement. However, position vectors s need not lie on all crossing points of the auxiliary grid. The auxiliary grid for example can describe a rectangular plane.

The number of the grid lines in a horizontal and/or vertical direction can each correspond to a number of rows and/or columns of sound transducers of the sound transducer arrangement. The number of the grid lines in a horizontal and/or vertical direction can, however, also be greater than a number of rows and/or columns of sound transducers in the sound transducer arrangement.

The method furthermore can comprise a determination of position vectors r on the reference surface R of the public area, wherein to one position vector s each a position vector r is associated. The allocation can be effected by means of a connecting line from the position vector s to the position vector r, on the basis of which the normalized direction vector $\hat{d}$ can each be determined. In particular, the direction vector $\hat{d}$ can each be determined by means of the calculation rule $$\hat{d} = \frac{r - s}{|r - s|}.$$

The entirety of the connecting lines in one non-limiting embodiment is designed such that they each do not cross or overlap each other in pairs. In particular, no connecting line intersects the respectively other connecting lines.

The allocation of the position vectors s to the position vectors r can be effected automatically, in particular with reference to a 3D-CAD file of the public area. This can be performed by a suitable mapping method. In particular, points and/or areas of the reference surface of the public area can be spared in the allocation, for example those which correspond to regions of the public area which are not to be hit by the common wavefront.

The position vectors r can be uniformly distributed on the reference surface R of the public area. As a result, they can correspond to uniformly distributed points in the public area. A uniform distribution of the points is ensured for example by the fact that two adjacent points each have the same distance from each other.

The reference surface R of the public area can be described by an auxiliary grid. The position vectors r at least partly can correspond to crossing points of the auxiliary grid.

The reference surface S of the sound transducer arrangement likewise can be described by an auxiliary grid, on which the position vectors s at least partly correspond to crossing points. Such an auxiliary grid is important in particular for the numerical treatment, as e.g. numerical integrations can easily be executed in the same by means of the trapezoidal rule.

Auxiliary grids on the reference surface S of the at least one sound transducer arrangement and auxiliary grids on the reference surface R of the public area can be transferable into each other. In particular, they can have the same number of lines in a horizontal and/or vertical plane. Due to the connection of the crossing points of the auxiliary grids, a suitable connection between the reference plane S of the at least one sound transducer arrangement and the reference plane R of the public area can be obtained.

The reference surface S of the at least one sound transducer arrangement can be a plane or for example an at least partly curved surface. In particular, a curvature of the reference surface S of the sound transducer arrangement in a horizontal direction can differ from a curvature in a vertical direction.

In a non-limiting embodiment, the reference surface S of the sound transducer arrangement is parameterized by means of coordinates s(u, v)=[x(u, v) y(u, v) z(u, v)], wherein u and v are real, continuous variables.

For determining the respective individual delay times $\tau_j$ for sound transducers j a scalar-valued function of delay times τ(u, v) initially can be determined for a finite quantity of position vectors of the form s=s(u, v) and subsequently the determinations of the delay time $\tau_j$ for sound transducers j can at least partly be effected by interpolations of at least two values of the form τ(u, v).

In a non-limiting embodiment, the delay times τ(u, v) can be determined by means of numerical integration of the discrete 2D vector field [$\Delta_u\tau$ $\Delta_v\tau$]. The delay differences $\Delta_u\tau$ in u direction or $\Delta_v\tau$ in v direction are given by $$\Delta_u \tau = \frac{\hat{d}_u}{c} \Delta u \text{ or}$$

-continued $$\Delta_v \tau = \frac{\hat{d}_v}{c} \Delta v,$$

wherein Δu and Δv each describe discrete step widths in u direction or v direction, c describes the sound velocity, and wherein $\hat{d}_u$ and $\hat{d}_v$ are given by the scalar products $$\hat{d}_u = \hat{d} \cdot s_u \text{ or}$$

$$\hat{d}_v = \hat{d} \cdot s_v,$$

wherein $\hat{d}$ each describes the normalized direction vector proceeding from the position vector s=s(u, v), and $s_u$ and $s_v$ each describe tangent vectors to the reference surface S proceeding from the position vector s=s(u, v).

The tangent vectors $s_u$ and $s_v$ are given by the partial derivatives $$s_u = \frac{\partial s}{\partial u} = \left[\frac{\partial x}{\partial u}\ \frac{\partial y}{\partial u}\ \frac{\partial z}{\partial u}\right] \text{ or}$$

$$s_v = \frac{\partial s}{\partial v} = \left[\frac{\partial x}{\partial v}\ \frac{\partial y}{\partial v}\ \frac{\partial z}{\partial v}\right].$$

In other words, in a method for determining the delay times τ(u, v) the two-dimensional discrete vector field [$\Delta_u\tau$ $\Delta_v\tau$] initially can be determined according to the rules $$\Delta_u \tau = \frac{\hat{d}_u}{c} \Delta u \text{ or}$$

$$\Delta_v \tau = \frac{\hat{d}_v}{c} \Delta v,$$

on the basis of tangent vectors $s_u$ and $s_v$ of the reference surface S of the sound transducer arrangement, the normalized direction vectors $\hat{d}$ and the sound velocity c. Subsequently, the vector field can be integrated by means of a numerical integration method. The function τ(u, v) obtained by means of the integration then describes the desired delay times.

The values of the function τ(u, v) describe the delay times at the position vectors s(u, v). For each individual combination of the parameters u and v, s(u, v) defines a separate position $s_i$. Subsequently, the delays at the driver positions can be determined by spatial interpolation.

The calculated time then is executed with the time of the nearest sample specified by the sampling frequency of the entire system.

In particular, the desired delay times are described by a function τ(u, v) whose gradient includes the two-dimensional vector field [$\Delta_u\tau$ $\Delta_v\tau$], wherein the components $\Delta_u\tau$ and $\Delta_v\tau$ are as given above. A wavefront can be regarded as a kind of relief, which at this point allocates a height to each crossing point of the grid. At this point, the gradient then is a vector which points in the direction of the largest increase in height. The amount of this vector indicates the largest slope at this point.

The sound velocity c can very well be dependent on the location, when e.g. a higher temperature exists in a higher region of the sound propagation area, which influences the sound velocity. The sound velocity can very well also be dependent on the location, which then is included in the calculation.

The numerical integration method can comprise the Composite Trapezium method, the Simpson method, the Romberg method or the more advanced inverse gradient method.

In case the reference surface S of the sound transducer arrangement is parameterized by means of a function s(u, v)=[x(u, v) y(u, v) z(u, v)], as described above, the normal n to the reference surface S of the sound transducer arrangement, which during the determination can be used for sound level correction, at the point described by s=s(u, v) is given by the cross product of $s_u$ and $s_v$ $$n=s_u \times s_v, \text{ wherein}$$

$s_u$ and $s_v$ are given by the partial derivatives, as described above.

BRIEF DESCRIPTION OF THE DRAWINGS

In the following, non-limiting embodiments will be described by way of example with reference to the Figures.

DETAILED DESCRIPTION

Figure 1:
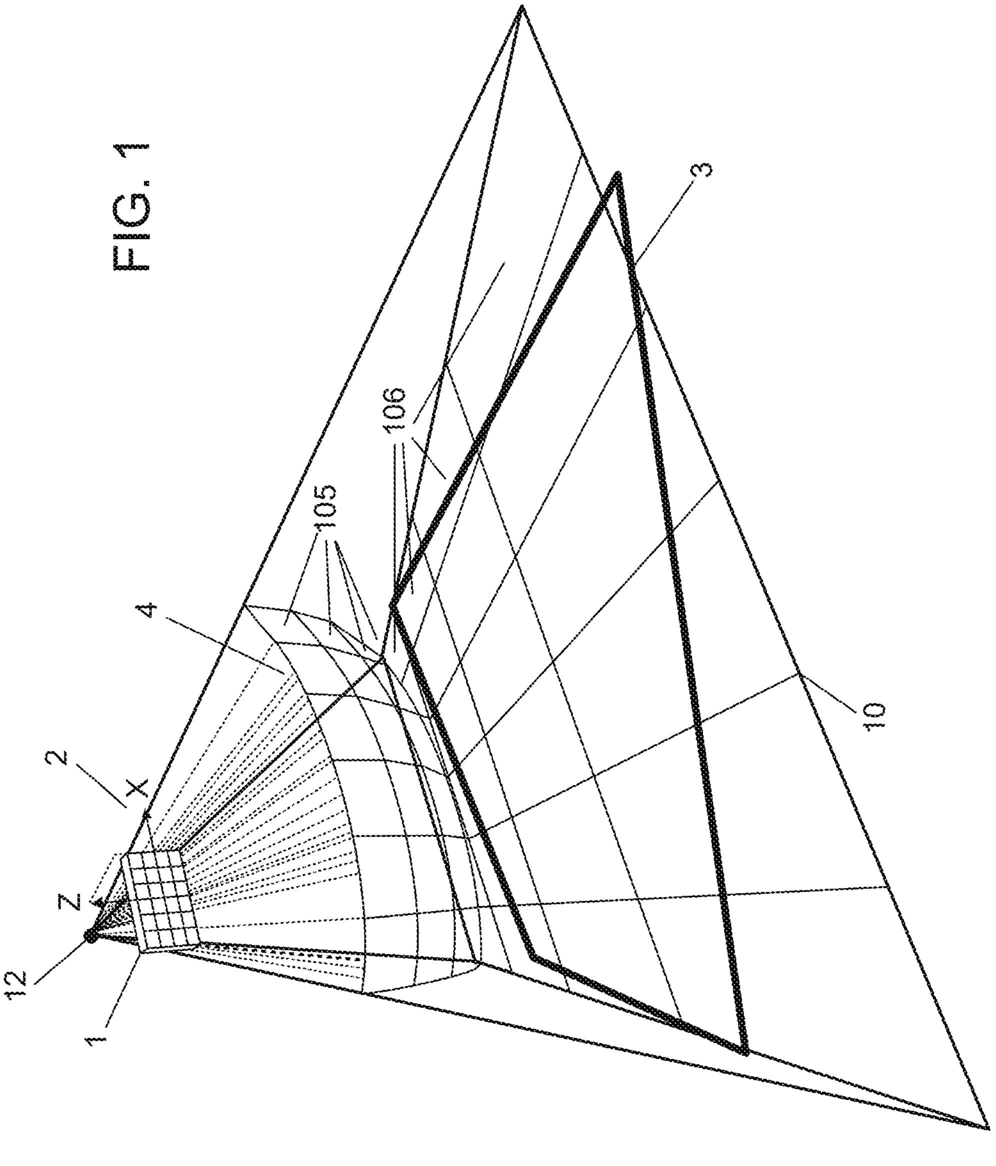
FIG. 1 shows a schematic representation of the wavefront of a virtual sound source of the wave field synthesis in a two-dimensional sound transducer arrangement.

FIG. 1 shows a given public area 3 which is to be filled with sound by means of a planar sound transducer arrangement 1 according to the principle of the wave field synthesis (WFS).

In operation, the sound transducers of the sound transducer arrangement 1 generate elementary waves 8 which are superimposed to form a common wavefront 4. The common wavefront 4 is designed such as to proceed from a virtual sound source 12. Correspondingly, the surface of the wavefront 4 formed from the elementary waves 8 of the sound transducers 9 corresponds to a spherical sector. For illustration purposes, the common wavefront 4 is split up into rectangles 105 which represent the shares of elementary waves 8 each generated in about the same number of sound transducers of the sound transducer arrangement 1 in the common wavefront 4.

In the spherical sector 4 the respective partial area 105, which is associated to a given number of sound transducers of the sound transducer arrangement 1, approximately has the same size. Correspondingly, the sound pressure at the same time is uniformly distributed on the surface of the wavefront 4.

The public areas 106 associated to these partial sections however have a surface area of very different size, on which the same energy of the associated spherical wave sector respectively is distributed. Correspondingly, the sound pressure levels are different in the various parts of the spectator area 3.

In FIG. 1, the virtual sound source 12 is located behind the sound transducer arrangement 1. The position of the virtual sound source 12 determines both the curvature of the common wavefront 4 and the direction in which it propagates. When the virtual sound source 12 is arranged close to the sound transducer arrangement 1, the coverage area is wide and the curvature of the common wavefront 4 is strong. Correspondingly, the surface area of the common wavefront 4 quickly grows with increasing distance, so that the sound pressure level quickly decreases.

The greater the distance at which the virtual sound source 12 is arranged from the WFS sound transducer arrangement 1, the narrower the emission angle and the smaller the curvature of the spherical sector. At a very large distance, an almost parallel wavefront is obtained, whose level hardly decreases with increasing distance. However, the coverage area 10 thereby is narrowed to such an extent that only a part of the spectator area 5 is supplied. The position of the virtual sound source 12 therefore is a compromise between a broad coverage area and an acceptable drop in sound pressure in the rear rows of seats of the public area 3 to be filled with sound. As is also clearly shown in FIG. 1, the same number of sound transducers of the sound transducer arrangement 1 supplies a part of the public area 3 to be filled with sound, which distinctly increases with increasing distance, and correspondingly the sound pressure strongly decreases here. It also becomes clear that surfaces outside the public area 3 to be filled with sound also are inadvertently hit by the common wavefront 4 in the entire coverage area 10.

It is known that it is possible to supply the given public area by means of a plurality of virtual sound sources, which have the same signal content. A corresponding method is described in WO 2015/022579 A3. A three-dimensional development of the method is described in the patent application DE 10 2019 208 631 A1. The combination of several wavefronts, which proceed from various virtual sound sources, permits a very balanced level profile over wide public areas 3. Reflection surfaces can be left out deliberately, and the level can be set separately for each individual wavefront. Even in reverberant environments, a high direct sound level with correspondingly good speech intelligibility can be achieved in the entire public area 3. The methods come close to achieving the goal of completely and very uniformly filling a given public area 3 with sound by means of a two-dimensional sound transducer arrangement 1 according to the principle of wave field synthesis.

Because of the very different positions of the virtual sound sources, this method however provides a time offset between the individual beams (e.g. a sound emission into a particular solid angle range). In the border area of the beams this leads to comb filter effects in the frequency response, when the time differences between the same are not compensated. Such a temporal compensation is possible because the individual virtual sound sources can be actuated temporally independently of each other. In the border areas of the individual beams, the offset can however be compensated completely only for one point, whereas at other points perceptible comb filter effects are inevitable in the upper playback frequency range, when wavefronts with a coherent signal content are superimposed in the transition areas.

At the event venue, the public area 3 is specified in principle, its shape and size in practice can hardly be adapted to the acoustic requirements for high-quality sonication. The area to be supplied only rarely is a planar rectangle. The area often is unsymmetrical and rises more in the rear areas in order to ensure a clear view of the stage. The position of the two-dimensional sound transducer arrangement 1, which can operate according to the principle of wave field synthesis, also is specified in principle, because the sound source is to be localized in the stage area.

Therefore, it is an object to employ a substantially two-dimensional sound transducer arrangement 1, as it is known from wave field systems, to generate a closed wavefront without transitions between individual beams, which in its shape in the azimuth and elevation planes is designed such that a uniform distribution of the sound pressure level over the given public area 3 is ensured. This can be achieved when the solid angle Q of the share of a given number of sound transducers in the wavefront to be generated is adapted for a given part of the public area 3 such that it each supplies an equally large part of the public area 3. With discrete virtual sound sources of the wave field synthesis the solution of the problem is not possible.

Non-limiting embodiments for methods will be explained below with reference to FIGS. 2 to 9.

Figure 2:
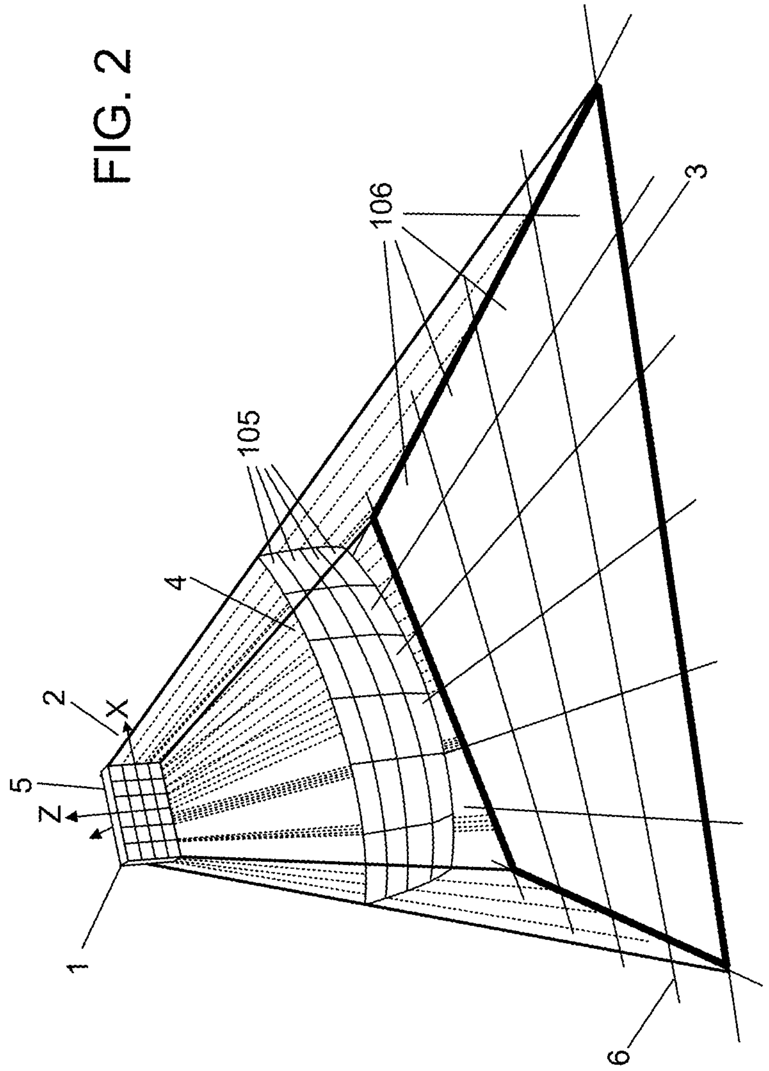
FIG. 2 shows a schematic representation of the wavefront of a shape of the wavefront adapted to the public area in accordance with the principles of the present disclosure.

FIG. 2 shows a sound transducer arrangement 1 with a plurality of sound transducers. By means of the sound transducer arrangement 1 a public area 3 is filled with sound. In operation, the individual sound transducers 9 of the sound transducer arrangement 1 each emit elementary waves 8 which are superimposed to form a common wavefront 4.

The sound transducers 9 of the sound transducer arrangement 1 are operated with individual delay times $\tau_j$, i.e. the sound transducers 9 emit elementary waves 8 at individual delay times. By operating the sound transducer arrangement 1 with the individual delay times T the common wavefront 4 is formed. In particular, due to the operation with individual delay times T, the common wavefront 4 can be formed such that it is adapted to the geometry of the public area 3.

The sound transducer arrangement 1 and the public area 3 are associated to a common coordinate system 2 in which the positions of the individual sound transducers of the sound transducer arrangement 1 are determined by position vectors $s_i$. The exact delay times of the individual sound transducers can be determined from the calculated delay times of the surrounding crossing points of the auxiliary grid by interpolation, when the sound transducers are not arranged exactly at the place of origin of a position vector $s_i$.

The sound transducer associated to these position vectors $s_i$ is driven with the individual delay time $\tau_j$ for emitting elementary waves 8. In principle, the individual delay times $\tau_j$ of the sound transducers 9 differ from each other, but they can also at least partly correspond with each other.

The determination of the delay times $\tau_j$ is effected by means of an allocation which allocates a crossing point of an auxiliary grid 6 in the public area 3 to each crossing point of the auxiliary grid 5. In particular, this allocation allocates a point in the public area 3 corresponding to a position vector $r_i$ to the sound transducer 9 with position vector $s_i$.

From this allocation direction vectors 7 are obtained, which proceeding from the crossing points of the auxiliary grid 5 point in the direction of the associated crossing points of the auxiliary grid 6 in the public area 3. The normalized direction vectors in the cuboid 60, proceeding from the position vectors $s_i$, each are determined by the rule $$\hat{d}_i = \frac{r_i - s_i}{|r_i - s_i|}.$$

The delay times $\tau_j$ of the sound transducer determined by means of the associated position vectors s; then are each chosen such that the local direction 50 of the common wavefront 4 at the position vector $r_i$ each corresponds to the direction of the normalized direction vector 61 $\hat{d}_i$.

According to the proposed solution, the normalized direction vectors 61 hence determine the shape of the common wavefront 4. In particular, local directions 50 of the common wavefront 4 can be determined by the direction vectors 7. The normalized direction vectors 61 each are perpendicular to the common wavefront 4.

By suitable choice of the allocation (see FIG. 6)—and hence of the normalized direction vectors 61—the common wavefront 4 can be shaped such that it adapts to the geometry of the public area 3. This is effected by the allocation of the grid points.

The wavefront 4 then is shaped such that about the same number of sound transducers of the sound transducer arrangement 1 is associated to equally large partial areas 106 of the public area 3. The corresponding partial areas 105 of the wavefront 4 then have a different size at the same time. The upper partial area in the sketch at this distance even is distinctly smaller than the lower one. Correspondingly, the sound pressure in this area is distinctly higher within the same wavefront than in the lower partial area determined for the spectator seats located nearby.

Figure 3:
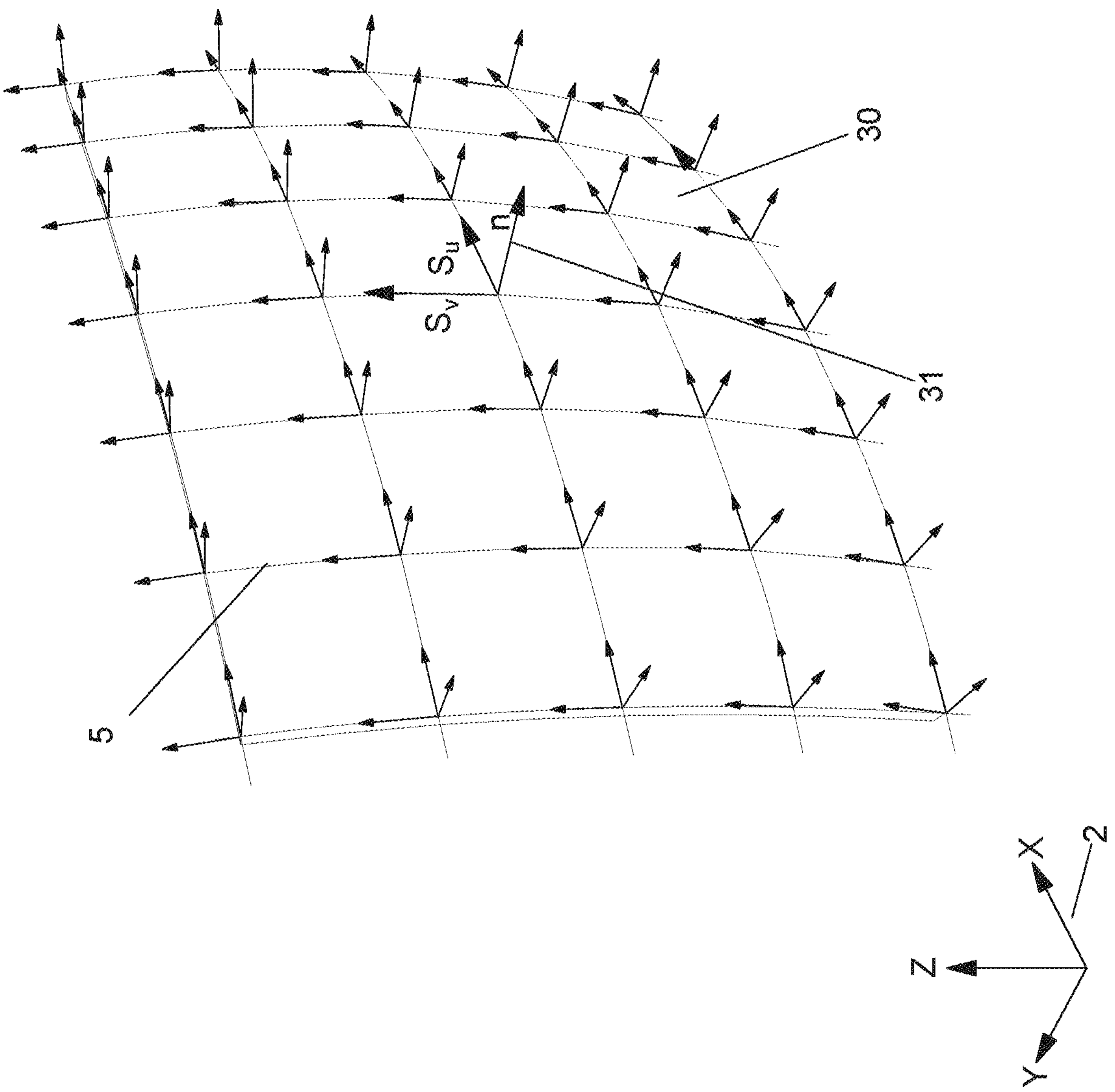
FIG. 3 shows the determination of normal vectors on a curved reference surface of a sound transducer arrangement.

FIG. 3 shows a reference surface 30 S which models the sound transducer arrangement 1 in a coordinate system 2. On the reference surface 30 S of the sound transducer arrangement 1 a regular, curved auxiliary grid 5 is arranged, with which the positions of the individual sound transducers 9 of the sound transducer arrangement 1 are aligned. By means of the reference surface 30 S, in particular by means of the auxiliary grid 5, coordinates can be determined for the individual sound transducers 9 of the sound transducer arrangement 1 in the 3D space.

The reference surface 30 S is parameterized by a system of curved coordinates by means of the equation s(u, v)=[x(u, v) y(u, v) z(u, v)], wherein u and v are real variables.

A normal 202 n on the reference surface 101 S with s(u, v) by definition is a normal on the tangential plane defined by the tangential vectors 201 $s_u$ and $s_v$, given by the partial derivatives of s(u, v), wherein $$s_u = \frac{\partial s}{\partial u} = \left[\frac{\partial x}{\partial u}\frac{\partial y}{\partial u}\frac{\partial z}{\partial u}\right] \quad (1a)$$

$$s_v = \frac{\partial s}{\partial v} = \left[\frac{\partial x}{\partial v}\frac{\partial y}{\partial v}\frac{\partial z}{\partial v}\right] \quad (1b)$$

The normal 31 n at s(u, v) is given by the cross product of $s_u$ and $s_v$ as $$n = s_u \times s_v. \quad (2)$$

The sound transducers 9 of the sound transducer arrangement 1 themselves need not be mounted at the crossing points of the auxiliary grid 5, their respective delay and their level are interpolated onto the crossing points in the three-dimensional space. The curvature of the reference surface 30 S and of the auxiliary grid 5 can be different in the azimuth plane than in the elevation plane, and it is also possible to curve the auxiliary grid 5 only in one plane.

In practice, the reference surface 30 S of the sound transducer arrangement 1 mostly will be a planar surface and the auxiliary grid 5 will thus be a planar auxiliary grid. This corresponds to the case that the sound transducers 9 substantially are mounted in a two-dimensional arrangement. A planar surface is regarded as a special case of a curved surface.

Figure 4:
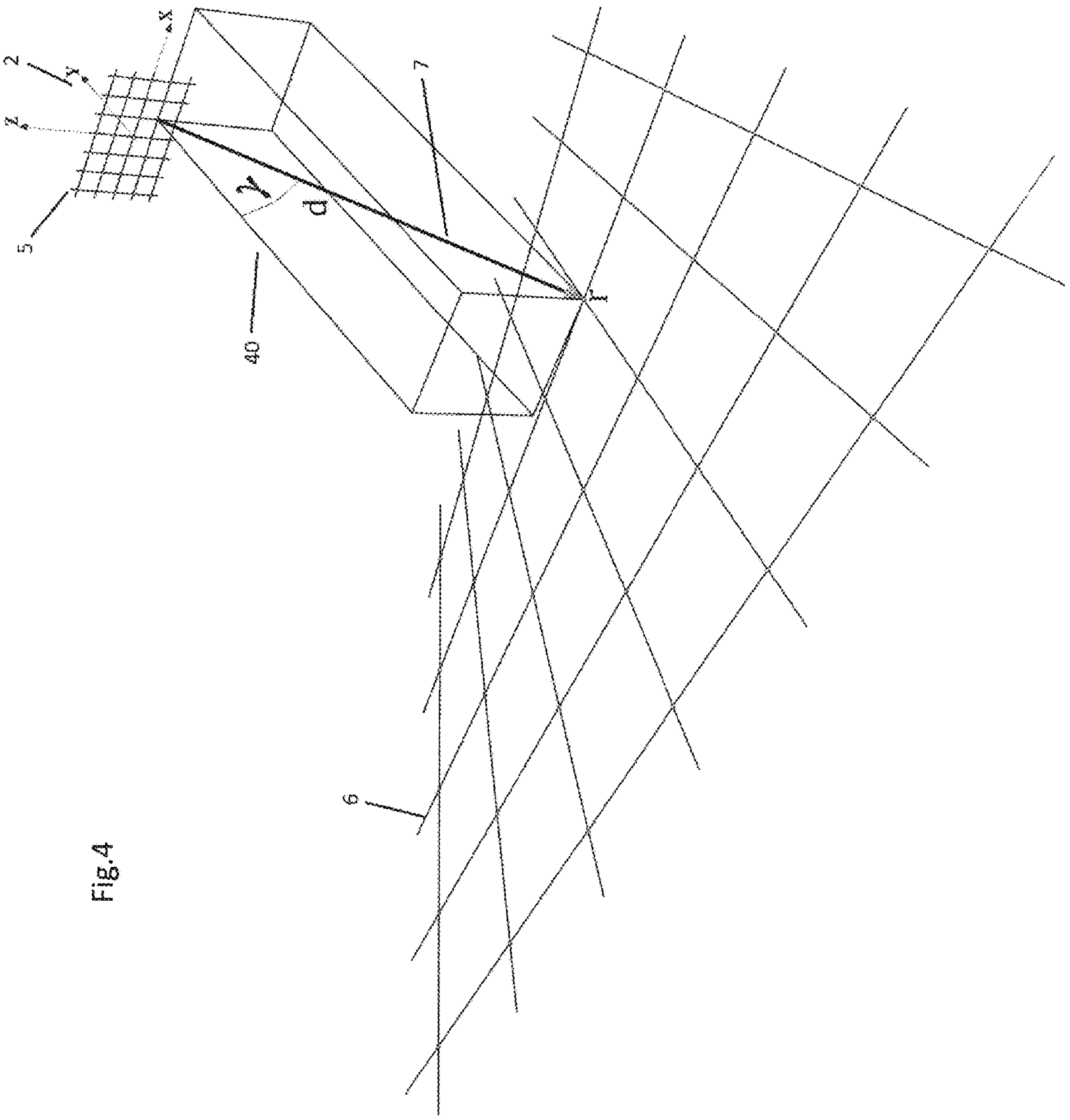
FIG. 4 shows the allocation of the auxiliary grid of a sound transducer arrangement to an auxiliary grid in the public area.

FIG. 4 shows the allocation of the auxiliary grid 5 of a sound transducer arrangement 1 to an auxiliary grid 6 in the public area 3. The solution approach shown here does not proceed from the position of a virtual sound source (as shown in FIG. 1), but from the given geometry of the public area 3 to be filled with sound and from the geometry of the sound transducer arrangement 1.

In principle, the public area 3 to be filled with sound can be arbitarily shaped, planar, curved or also ascending. FIG. 4 shows an irregularly shaped public area 3 to be filled with sound, which in particular is not symmetrical and in the rear area ascends more strongly on the right than on the left side.

With conventional approaches, but also with virtual sound sources of the wave field synthesis, the object to very uniformly supply a public area as the one shown in FIG. 4 with direct sound can be solved only insufficiently, because the curvature of the wavefronts of virtual sound sources of the wave field synthesis always is a spherical sector.

By means of the illustrated allocation of the auxiliary grids 5 and 6, on the other hand, a common wavefront 4 can be generated, whose shape is adapted to the geometry of the public area 3 to be filled with sound.

For the solution of the problem a coordinate system 2 is determined.

Coordinate points distributed over the public area 3 to be filled with sound are associated to the coordinate system 2. In FIG. 4, these coordinate points in the public area 3 are arranged at the crossing points of an auxiliary grid 6, but they can also be distributed in the public area 3 by other mapping methods.

Moreover, an auxiliary grid 5 is associated to the coordinate system 2, by which the positions of the sound transducers 9 of the sound transducer arrangement 1 can be determined. The auxiliary grid is shown in FIG. 3 as a planar, regular auxiliary grid. In principle, however, the auxiliary grid can also be curved, i.e. include curved lines. In principle, the auxiliary grid 5 can be arranged on a reference surface by which the sound transducer arrangement 1 is modeled.

The number of the coordinate points in the public area 3 corresponds to the number of crossing points of the auxiliary grid 6. Thus, a coordinate point of the auxiliary grid 6 in the public area 3 can be associated to each crossing point of the auxiliary grid 5. The distribution of the coordinate points should be effected over the entire public area 3 with distances between the individual coordinate points as uniform as possible.

To each crossing point of the grid 5 a coordinate point with the position r(x, y, z) in the public area 3 is associated. The connecting line 7 between the crossing points of the auxiliary grid 5 and its associated coordinate point in the public area 3 then forms a vector in the coordinate system 2, which forms the basis for the calculation of runtime and level of the audio signal.

The illustrated planar auxiliary grid 5 of the sound transducer arrangement 1 has the shape of a rectangle whose aspect ratio is equal to that of the planned sound transducer arrangement 1, for example in the form of a sound transducer array. It should have at least as many crossing points as sound transducers 9 are provided in the sound transducer arrangement 1. In principle, the aspect ratio is not defined, so that it would also be possible to construct an individual line of sound transducers when this is appropriate for the given spatial situation in the public area 3.

The distance of the grid lines of the auxiliary grid 5 can be different in the horizontal and vertical planes, but should at least correspond to the number of rows and columns of the two-dimensional sound transducer arrangement 1.

The sound transducers 9 of the sound transducer arrangement 1 can be mounted with their acoustic center in the crossing points of the auxiliary grid 5. Their position can, however, also deviate from these crossing points, wherein their respective runtimes and levels are determined by interpolation of the values calculated for the surrounding grid points.

A higher number of grid lines improves the accuracy of the interpolation. A smaller number of grid lines leads to the fact that no uniformly curved wavefront, but a wavefront composed of planar partial surfaces is obtained. The resulting diffraction effects lead to local irregularities in the frequency response.

In principle, physical sound transducers 9 need not be associated to all crossing points of the auxiliary grid 5. This provides for the interruption of the equipment in the areas in which low midrange sound transducers 9 have their sound outlet opening. In addition, all sound transducers 9 can be distributed on the surface slightly irregularly, as it has been described in DE 10 2009 006 762 A1. Undesired aliasing effects in the public area 3 can thereby be reduced, because the resulting comb filter effects are slightly compensated statistically in the frequency response.

The auxiliary grid 6 placed over the public area 3 completely includes the same. The auxiliary grid 6 is adapted in its shape to the public area 3. This can be accomplished manually in principle. In practice, however, several hundreds to several thousands of grid points are necessary for the distance of the sound transducers 9 to each other to be sufficiently small, in order to achieve a playback largely free from audible aliasing effects. The small number of grid lines in the sketches serves for clarity in the explanation of the operating principle.

Therefore, it is advantageous to automatically determine the coordinate points in the public area 3 with reference to a 3D CAD file of the public area 3 by a suitable mapping method. Areas which are not to be hit directly by the common wavefront 4, because undesired reflections proceed from the same, can also remain free of associated grid points. No sound transducers 9 whose wavefront is sent directly in their direction are associated to the same. The coordinate points are shifted from these areas without changing their number. Surrounding coordinate points are shifted correspondingly in order to maintain a uniform distribution over the public area 3. To each crossing point of the auxiliary grid 5 in the plane of the two-dimensional sound transducer arrangement 1 a reference point in the public area 3 to be filled with sound is to be associated.

A visualization in a 3D CAD file facilitates the shutdown of non-occupied public areas 3. The calculations remain unchanged in principle, and only those sound transducers which are associated to non-occupied public areas 3 are not supplied with a signal. This results in a lower diffuse-field sound level at the venue, which contributes to a better speech intelligibility in the occupied public areas 3.

Figure 5:
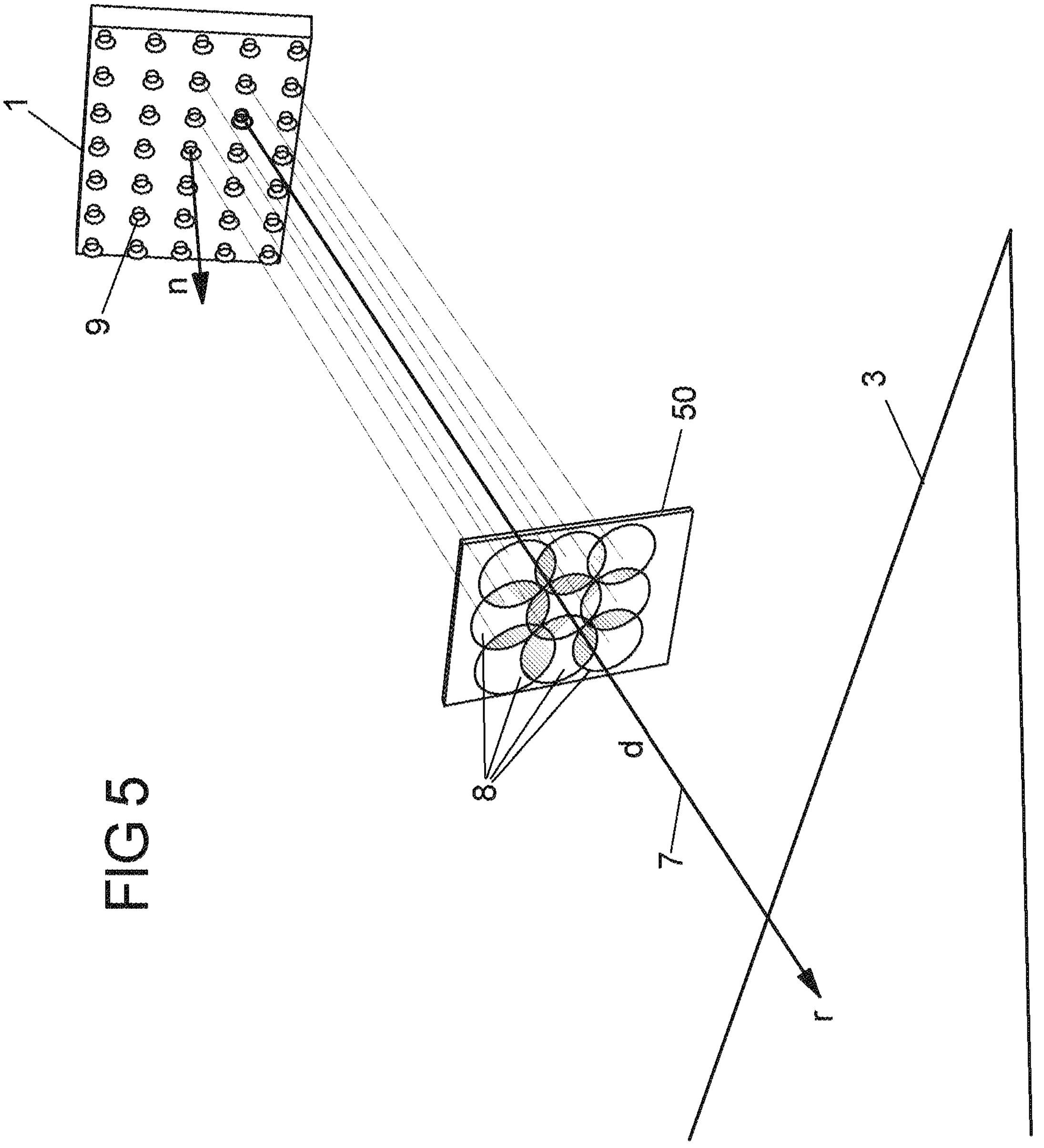
FIG. 5 shows the formation of a local direction vector of the wavefront, which is obtained from surrounding elementary waves proceeding from a sound transducer and shows the public area.

FIG. 5 by way of example illustrates how the local curvature 50 of the wavefront 4, which need not be a spherical sector according to the described method, results from the superposition of the elementary waves 8 of the surrounding sound transducers 9. In the example, the acoustic centers of the sound transducers 9 are mounted on the crossing points for simplification.

The individual sound transducer 9 shown in black in the sketch has an undirected half-space radiation corresponding to the principle of wave field synthesis. The elementary wave 8 alone, which is generated by the same, correspondingly cannot form a direction vector. The associated local direction vector d of the wavefront only is obtained at some distance from the sound transducer arrangement 1 by superposition of the elementary waves 8 of the surrounding sound transducers.

The direction vector 7 d can be determined for this crossing point by means of the rule $$d = r - s \tag{3}$$

It always is orthogonal to the local wavefront 50.

In the exemplary representation in FIG. 5, the point described by the vector r lies on a crossing point of the auxiliary grid 6 of the public area 3.

In principle, the direction vector 7*d* can also be determined without making use of the auxiliary grids 5 and 6. In this case, the direction vector 7*d* proceeds from a position vector s on a reference surface 30 S, which models the sound transducer arrangement 1, and points to a position vector r in the public area 3, or to a position vector r, which describes a point on a reference surface 30 R modeling the public area 3.

In the following, there is described a method of how to derive delay times and levels for the individual sound transducers 9 from given direction vectors 7, so that the superposition of their elementary waves 8 is superimposed to form a wavefront which is consequently aligned with the given public area 3.

Figure 6:
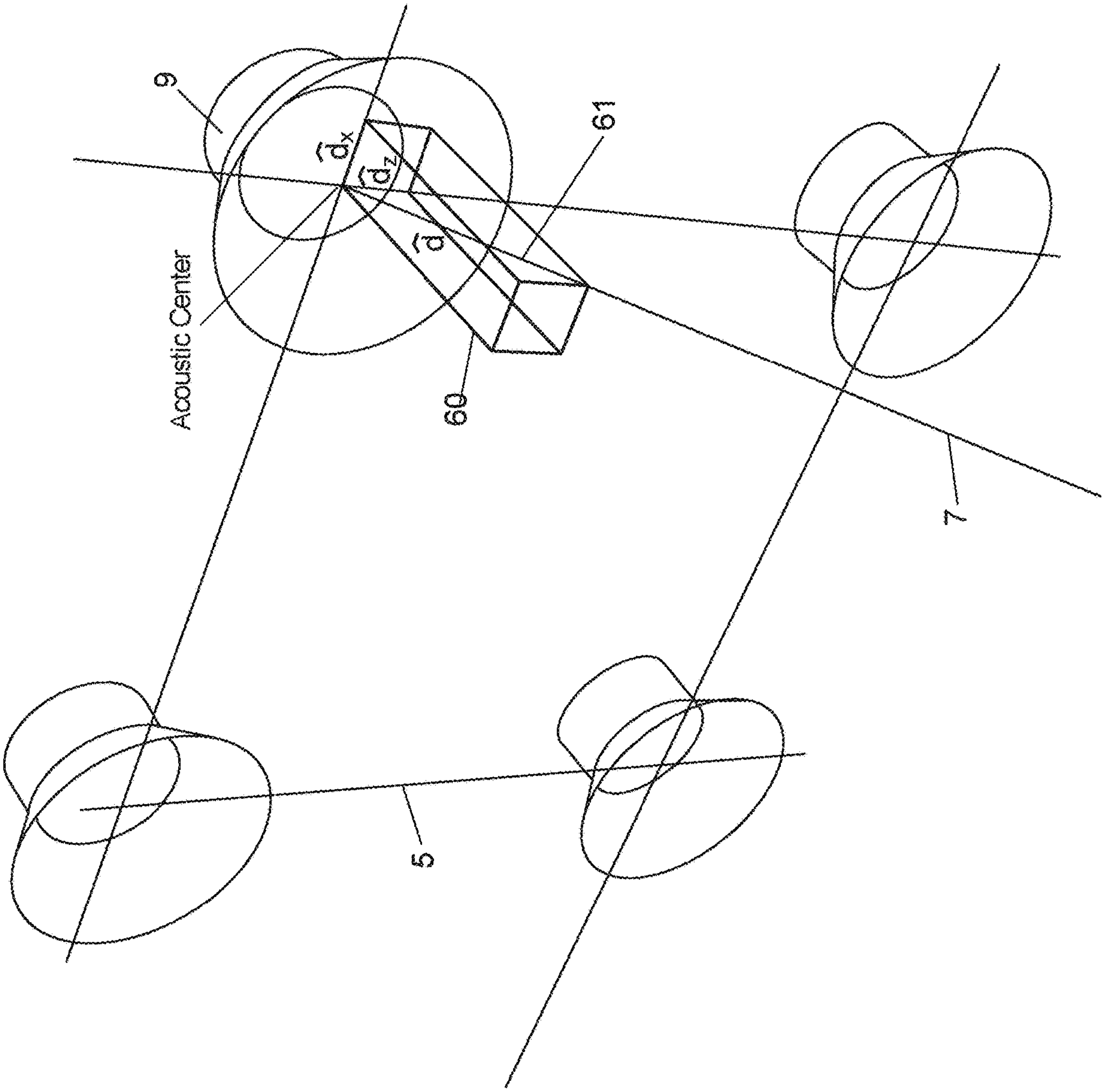
FIG. 6 shows the formation of a normalized direction vector of the length one.

In FIG. 6, the direction vector 7 d selected from FIG. 4 by way of example is attributed to the length of the normalized direction vector 61 $\hat{d}$, which is defined as $$\hat{d} = \frac{d}{\|d\|} \tag{4}$$

The desired wavefront, which is generated by the sound transducer arrangement 1, in particular in the form of a curved or planar array, can be approached locally by a planar wave which propagates along (i.e. locally in the direction of) the normalized direction vector 61 $\hat{d}$. Each local planar wave can be directed in the desired direction by operating the sound transducers 9 of the sound transducer arrangement 1 according to the corresponding delay times of the signal.

The delay time τ at each position s(u, v) on the reference surface 30 S of the sound transducer arrangement 1 is described by the scalar-valued delay function τ(u, v).

In the vector calculus, the gradient of a scalar-valued function t of several variables is a vector field ∇τ whose components can be determined by partial derivatives of τ, in particular it applies $$\nabla\tau(u, v) = \left[\frac{\partial\tau}{\partial u} \;\; \frac{\partial\tau}{\partial v}\right] \tag{5}$$

The delay gradient ∇τ(u, v) can be determined as follows:

The scalar products of the normalized direction vectors 61 $\hat{d}$ and tangent vectors $s_u$ and $s_v$ or $\hat{d}_u$ and $\hat{d}_v$ are given by $$\hat{d}_u = \hat{d} \cdot s_u \tag{6a}$$

$$\hat{d}_v = \hat{d} \cdot s_v \tag{6a}$$

The scalars $\hat{d}_u$ and $\hat{d}_v$ can be physically interpreted as the local differentials of the path lengths between the planar wave and the tangential plane of the sound transducer arrangement 1.

In the special case of a planar sound transducer arrangement 1, as it is shown in FIG. 6, $\hat{d}_u$ and $\hat{d}_v$ are equal to the variables $\hat{d}_x$ and $\hat{d}_z$ illustrated in FIG. 6, which represent the x and z components of the vector $\hat{d}$.

The relation between the delay gradient ∇τ(u, v) from equation (5) and the components $\hat{d}_u$ and $\hat{d}_v$ is given by the sound velocity c. Therefore, the partial derivatives of the delay function t can be described as $$\frac{\partial\tau}{\partial u} = \frac{\hat{d}_u}{c} \tag{7a}$$

and $$\frac{\partial\tau}{\partial v} = \frac{\hat{d}_v}{c}. \tag{7b}$$

In practice, the distance between the sound transducers 9 is finite. Therefore, the differential equations from equations (7a) and (7b) must be transcribed into discrete differential equations. The delay differences $\Delta_u\tau$ and $\Delta_v\tau$ in the u or v direction now are given by $$\Delta_u\tau = \frac{\hat{d}_u}{c}\Delta u \tag{8a}$$

and $$\Delta_v\tau = \frac{\hat{d}_v}{c}\Delta v, \tag{8b}$$

wherein $\Delta_u$ and $\Delta_v$ are the discrete step widths in the u and v directions. The required delay can be found by numerical integration of the discrete 2D vector field $[\Delta_u\tau\ \Delta_v\tau]$.

Several mathematical integration methods are available, such as the Composite Trapezium, Simpson or more advanced inverse gradient method. The integration constant can be chosen freely. In order to meet the causality condition and minimize the system latency, the minimum delay across all drivers is subtracted from the calculated delays.

The relative amplification factor $\hat{d}_n$ for each position in the sound transducer arrangement 1 is given by the scalar product of normalized direction vector 61 $\hat{d}$ and normal n according to the equation $$\hat{d}_n = \hat{d} \cdot n, \tag{9}$$

wherein the normal n is as defined in equation (2).

By operating the sound transducers 9 according to the relative amplification factors $\hat{d}_n$ it is ensured that the sound pressure level at the receiver position r is independent of the angle of the direction vector d to the normal n.

With rising slope of the emission with respect to the normal n the number of the sound transducers 9 increases at a given solid angle Ω, so that the sound pressure level would rise here.

The compensation according to equation (9) will correct this corresponding to a cosine function of the angle γ in FIG. 4. With a uniform distribution of the coordinate points r a very homogeneous distribution of the sound pressure over the entire public area 3 to be filled with sound hence is ensured.

Figure 7:
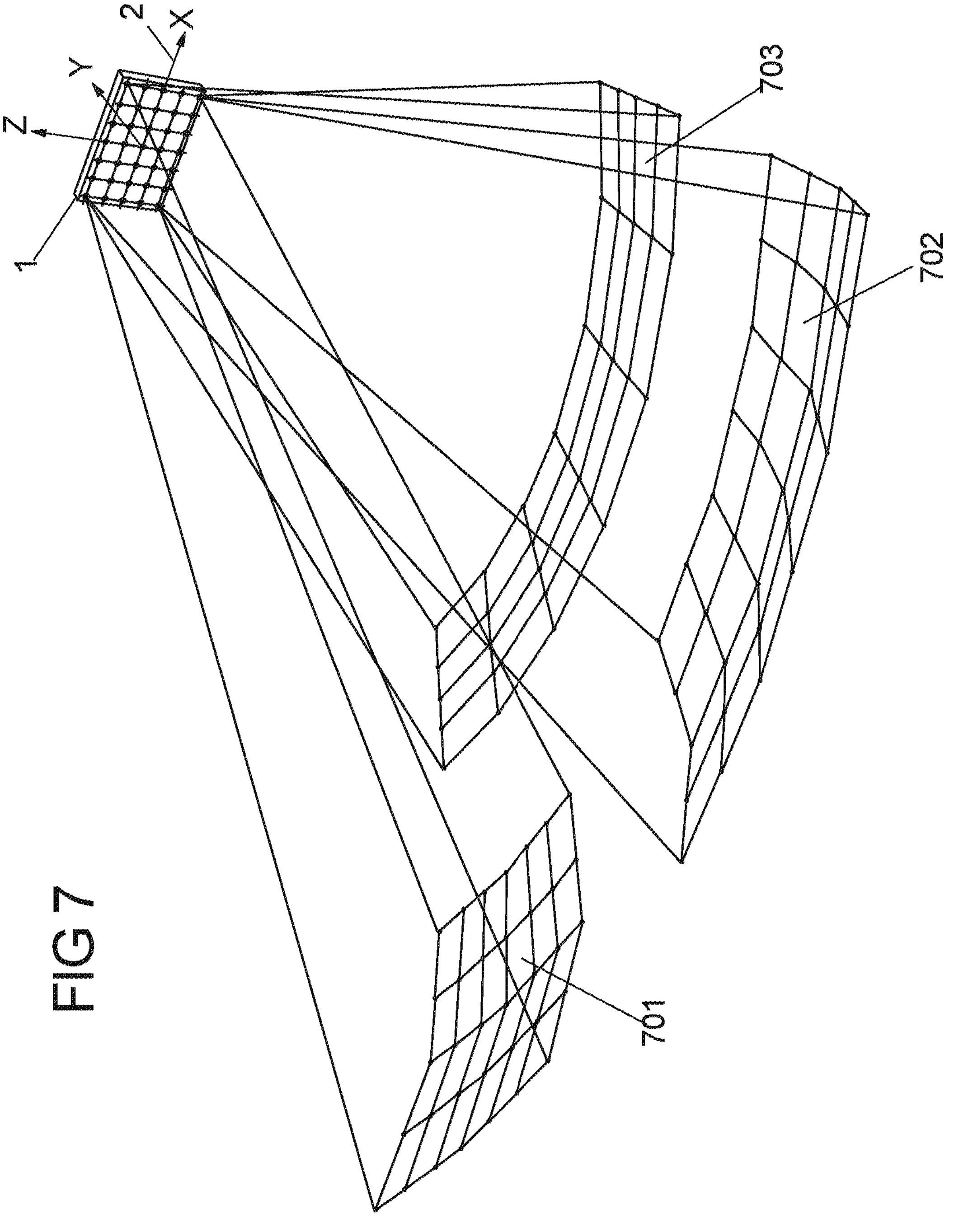
FIG. 7 shows a non-limiting embodiment in which the public area is split up into individual partial areas with a different signal content.

It is shown in FIG. 7 that the public area 3 to be filled with sound can also be split up into individual partial areas 701, 702, 703 with a different signal content.

In principle, partial areas of the sound transducer arrangement 1 might also be assigned to these partial areas. Very accurate and targeted sonication is obtained, however, when the high directivity of the entire arrangement is utilized in order to align the signal contents with the desired public areas 3. In each of the partial areas 701, 702, 703 the number of the crossing points 6 then corresponds to the number of the crossing points 5 of the auxiliary grid of the sound transducer arrangement 1.

With the same signal content, the division into partial areas is not expedient when the partial areas are not spatially separated sufficiently. With a coherent signal content, comb filter effects then would be obtained at the area boundaries.

Individual partial areas can also be smaller than the associated surface area of the sound transducer 9, as far as the crossing points of the auxiliary grid lie closer to each other in the public area 3 than in the auxiliary grid of the sound transducer arrangement 1. In this case, concave wavefronts are obtained, whose sound pressure level is higher in the public area 3 than on the generating emitter surface itself.

It is also possible to reduce the size of an auxiliary grid in the public area 3 to a point. By the described vector-based method, the two-dimensional sound transducer arrangement 1 then generates the same concave wavefront as it is obtained at this point in a two-dimensional sound transducer arrangement 1 according to the principle of the wave field synthesis with a virtual sound source.

With the coordinates of the grid points 5 on the reference surface of the sound transducer arrangement 1 and its associated coordinates 6 in the public area 3 it is also possible to compensate the drop in sound pressure at higher frequencies by airborne sound insulation. With a given air humidity, the frequency-dependent damping values of the air per meter are exactly known. A corresponding inverse equalization curve can then be associated to each sound transducer 9, because the distance to the associated spectator seat (given by the length of the direction vector d in FIG. 5) is known.

In large public areas 3, the drop in sound pressure at the upper limit of the audio range can distinctly rise above ten dB with dry air. In a flat sound transducer arrangement 1, this frequency range anyway must be actuated at a distinctly higher level, because the level gain will become noticeable only at greater wavelengths due to the improved adaptation of the synchronously operating loudspeaker group. The additional compensation of the airborne sound insulation for the distant public areas 3 therefore can bring the system to an output swing limit at high signal levels in the upper audio frequency range.

A solution to this problem consists in arranging the coordinate points r more closely to each other with increasing distance of the sound transducer arrangement 1. In the distant public areas 3, a smaller partial surface 106 then is associated to the same number of sound transducers 9. Each halving of the surface effects a rise in level by 3 dB, by which the actuation of the associated sound transducers 9 would have to be reduced, so that the sound pressure level remains almost the same in the entire public area 3. The correspondingly reduced actuation signal involves a greater headroom in the associated amplifiers. The same can be utilized to equalize the actuation signals more strongly.

In the described method, the localization of the sound source fundamentally differs from the localization of a virtual point sound source of the wave field synthesis. In the wave field synthesis, virtual sound sources in principle are localized independently of the position of the listener in the coverage area, comparable to a real sound source, at their virtual starting point.

The wavefront tailored to the public area 3, however, does not proceed from defined positions of virtual sound sources. It is obtained so to speak from an extended source of many different starting points in the area behind the sound transducer surface. The spectator in the front left seat in FIG. 2 will allocate the starting point of the wavefront in the lower left corner to the sound transducer arrangement 1; for the spectator at the rear right, the sound comes from the upper right corner of the sound transducer arrangement 1. This is not a disadvantage for playback without an optical reference to the sound source, but corresponding to FIG. 2 a spatial playback is only possible to a limited extent.

Nevertheless, the method can be associated to the field of wave field synthesis, because it is possible from the theoretical derivation of the wave field synthesis from the Kirchhoff-Helmholtz integral to generate any form of wavefront (Jens Ahrens: The Single-layer Potential Approach Applied to Sound Field Synthesis Including Cases of Non-enclosing Distributions of Secondary Sources, Dissertation, Technische Universität Berlin, 2010).

Additional non-limiting embodiments are provided as follows.

It has so far been assumed that the sound transducers 9 of the sound transducer arrangement 1 are arranged in a regular grid. In practice, however, the distribution of the sound transducers 9 can also be irregular. The runtimes τ initially are calculated to form a sufficiently dense regulary grid, after which the runtimes to the irregularly placed sound transducers are interpolated.

Figure 8:
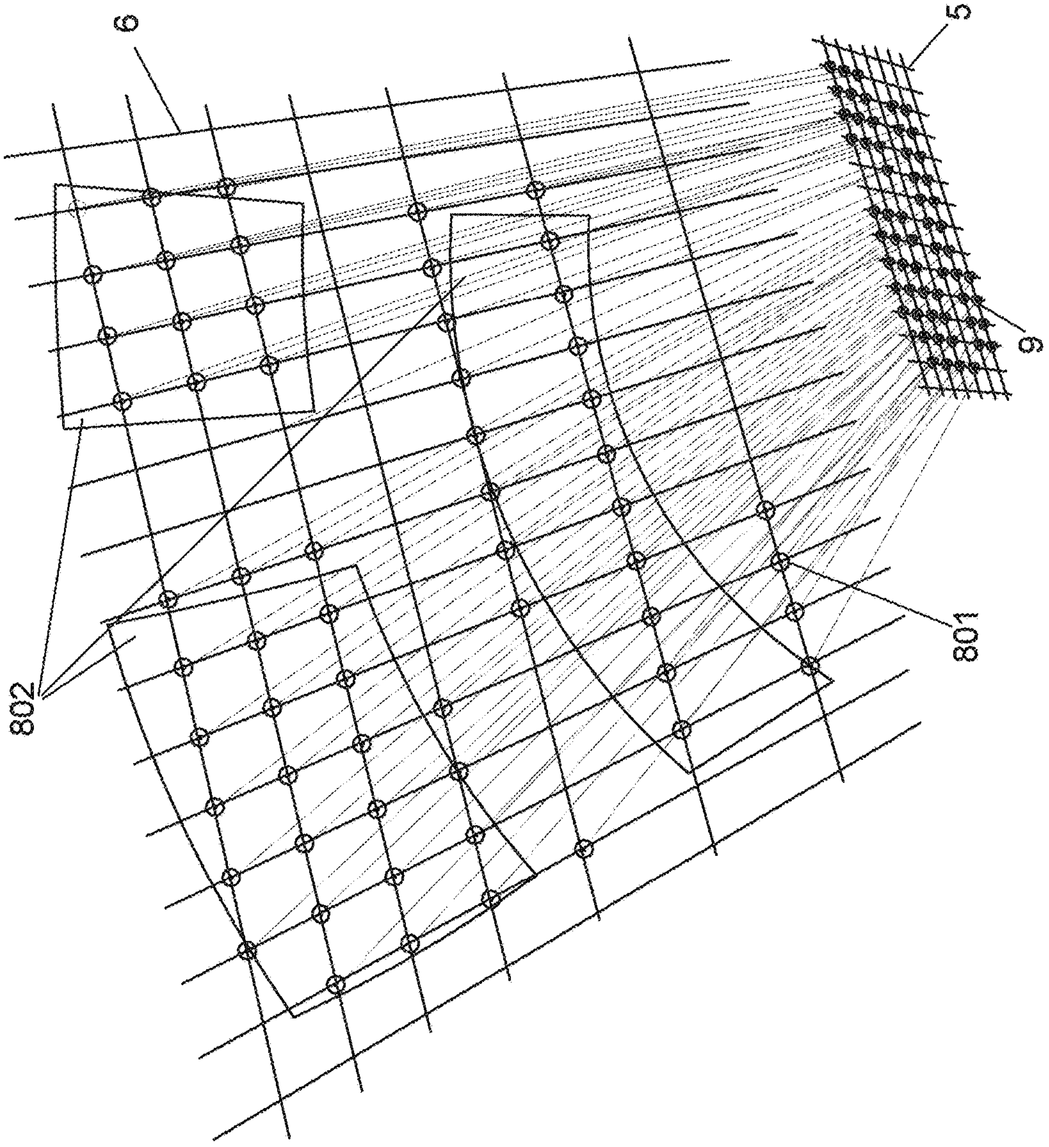
FIG. 8 shows an adapted sound transducer equipment for a non-variable public area.

FIG. 8 shows a complex public area 3 with partial areas 802 and illustrates an equipment of the sound transducer arrangement 1 with sound transducers 9, wherein the equipment is adapted to the complex design of the public area 3.

In the illustrated embodiment, the allocation between points on the sound transducer arrangement 1 and points in the public area 3 is effected by means of an allocation of crossing points of the auxiliary grids 5 of the sound transducer arrangement 1 to crossing points of the auxiliary grid 6 of the public area 3.

However, sound transducers 9 of the sound transducer arrangement 1 are not associated to all crossing points of the auxiliary grid 5, in other words crossing points of the auxiliary grid 5 remain bare. In particular, bare crossing points are to be found between equipped crossing points.

In the case of fixed installations, the shape of the sound transducer arrangement 1 thus can be adapted to the complex design and/or the geometry of the public area 3. This provides for a more effective use of the sound transducers.

The auxiliary grid 6 in the public area 3 can be a rectangle, for example, and in particular can extend beyond the public surface.

Irregular shapes of the auxiliary grid 6 can lead to false results when making calculations according to the described method.

Crossing points of the auxiliary grid 6 in the public area 3, to which no audience is associated, i.e. which in the present case lies outside the partial areas 5*a*, 5*b*, 5*c* of the public area 3 to be filled with sound, are associated to auxiliary grid points of the auxiliary grid 5 of the sound transducer surface, which are not equipped with sound transducers or are switched off.

Low midrange sound transducers used possibly also are aligned with the auxiliary grid 5 of the sound transducer arrangement 1. The calculation of their runtimes and levels also is determined by the nearby grid points. The time shift with a possible depth offset must be compensated for. In this way, the phase position of subwoofers can also be adapted effectively. According to the method, the shortest of all calculated runtimes to the individual sound transducers is subtracted from all calculated runtimes, so that the front of the wavefront adapted to the public area 3 always is generated directly.

Another aspect of the solution relates to a device which is shaped corresponding to the rules of the described method. It can be used to generate an individual wavefront, whose shape is adapted to the given audience area, from a mono signal without an electronic time shift of the signal. This mechanical solution may be advantageous with fixed installations in an acoustically problematic environment. In this way, a sound system can be installed with reasonable effort, which ensures a high direct sound fraction with correspondingly good speech intelligibility even under unfavorable acoustic conditions.

Figure 9:
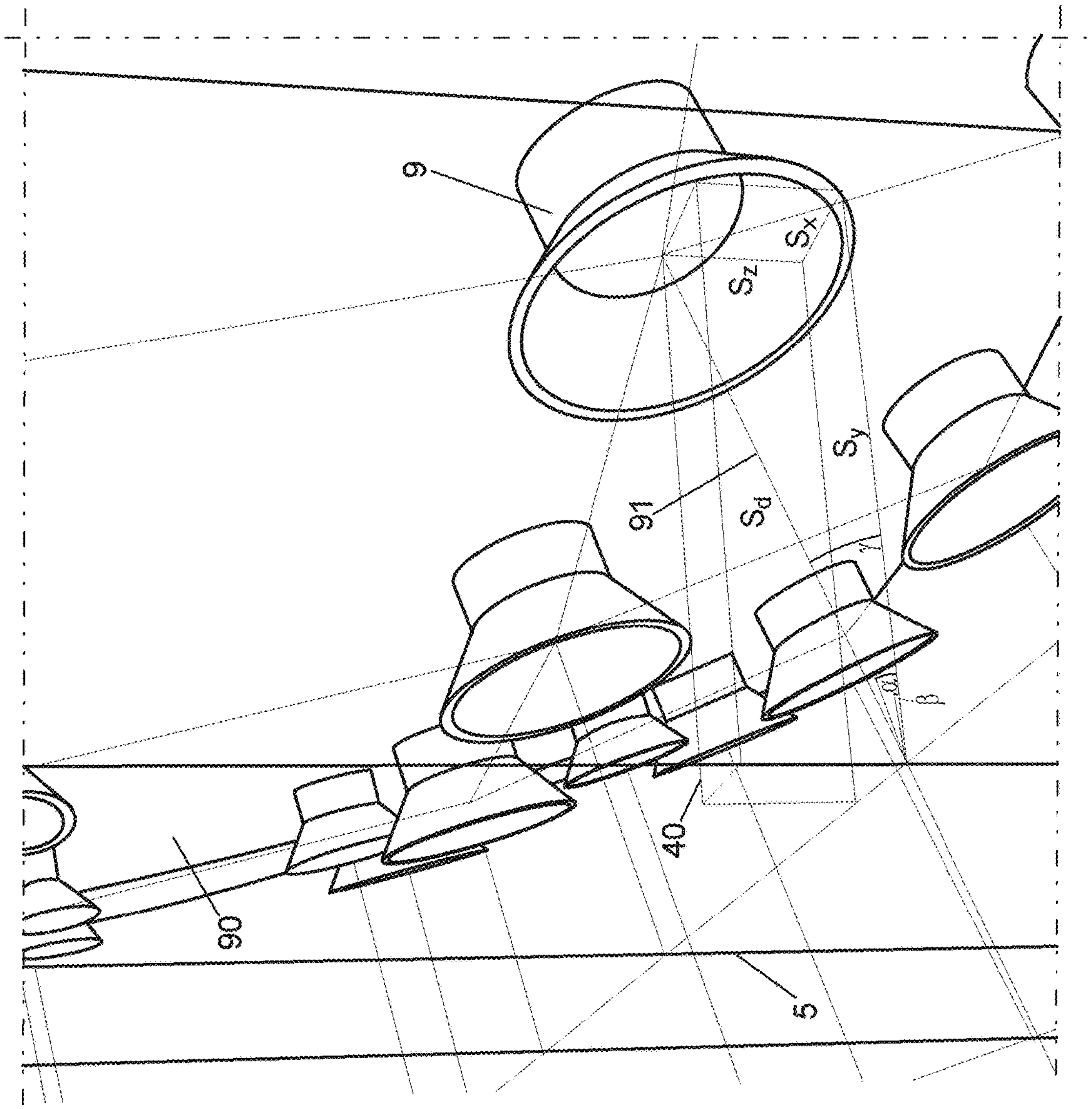
FIG. 9 shows a non-limiting embodiment with a mechanically curved sound transducer surface.

In FIG. 9 a mechanically curved sound transducer arrangement 1 is illustrated by way of example.

By means of the mechanically curved sound transducer arrangement 90 the public area 3 to be filled with sound, which is described with reference to FIG. 4, can be supplied with a tailored common wavefront 4.

The operation of the sound transducers 9 of the sound transducer arrangement 1 is mechanically realized according to the delay times $\tau_j$ obtained by the described method. All sound transducers are supplied with a coherent signal, i.e. from a mono signal source.

The mechanical realization is achieved by suitable positioning of the sound transducers 9 on the mechanically curved sound transducer arrangement 90, in particular by a suitable spatial offset, in particular an offset in the propagation direction of the common wavefront, of the sound transducers 9 relative to each other.

To determine the respective position of the sound transducers 9 in the sound transducer surface adapted for the public area 3 to be filled with sound, a path length $S_d$, proceeding from the associated grid point of a planar auxiliary grid 5, is removed along the elongated diagonal of the cuboid 40 determined for the unit vector 61 $\hat{d}$.

By means of the known alternate angles α and β the new coordinates for the acoustic center of the respective sound transducer 9 and also for its alignment can be determined in the right-angled triangles of the cuboid 40.

The delay times for the individual sound transducers 9 calculated by the described methods are obtained by the mechanical offset of the acoustic centers of the respective sound transducers 9 along the diagonal $S_d$ of the respective cuboids.

The different signal levels for the individual sound transducers 9 of this two-dimensional sound transducer arrangement 1 can then be realized approximately on a common power amplifier by suitable parallel and series connection of the sound transducers 9 or can be realized by connection to different amplifiers, which each are associated to sound transducers 9 with approximately the same level values.

As far as the sound transducers 9 have no significant drops in their spatial emission characteristics, they need not be aligned in the direction of the diagonal of the cuboid. The method can then also be realized by a device for the transverse displacement of sound transducers, as it is described in WO 2015/004526 A2. The displacement $s_y$ of the acoustic center from the grid point of the original sound transducer grid then results from the quotient $$\frac{s_d}{\cos\gamma}.$$

A single mechanical device cannot be used to generate spatial sonication of the public area 3. It is suitable for ensuring sonication with manageable effort, in which the distribution of the sound pressure level in the entire public area 3 is very uniform and which ensures high speech intelligibility even in acoustically unfavorable spaces.

In the following, some additional and non-limiting embodiments will be described for methods and apparatuses for filling a given public area 3 with sound by means of a sound transducer arrangement 1, which are actuated with individual delay times and levels in accordance with the principle of wave field synthesis.

For example, in a variant 1 of a method the shape of the common acoustic wavefront 4, which is composed by superposition of elementary waves 8 of the sound transducers 9, can be determined by the given geometry of public area 3 and sound transducer arrangement 1 in such a way that in a common coordinate system 2 a coordinate point in the public area 3 is associated to each crossing point of a regular, at least partly planar and/or curved grid which is associated to the sound transducers, wherein a vector is obtained from their connecting line, from which the delay time for the respectively associated sound transducer 9 can be calculated by mathematical combination, whereby the local curvature of the wavefront, which is obtained by superposition of the elementary waves 8 of the surrounding sound transducers 9, advances in the direction of this vector, so that a closed wavefront is obtained, which can reach the entire public area 3 and in which a level correction for each sound transducer 9 becomes possible from its associated vector, which improves the homogeneity of the sound pressure over the entire public area 3.

In a non-limiting embodiment of variant 1, the coordinate points in the plane of the two-dimensional sound transducer arrangement 1 for example are crossing points of a planar or curved grid, to which coordinate points in a common coordinate system 2 are associated in the public area 3, wherein the connecting lines between the respectively associated grid points and points in the public area 3 do not cross or intersect each other.

In a non-limiting embodiment, the number of grid lines in the plane of the two-dimensional sound transducer arrangement 1 in the horizontal and vertical directions each corresponds to the number of sound transducers mounted in the rows and columns of the two-dimensional sound transducer arrangement 1. Alternatively, the number of grid lines can be greater than the number of sound transducers 9 in the rows and columns of the two-dimensional sound transducer arrangement 1, wherein the acoustic center of the individual sound transducers 9 can be arranged in the crossing point of the grid lines. The values for delay time and/or level can be determined for example by interpolation of the values of the surrounding grid points such that the reference points in the public area 3 in all three spatial dimensions can be adapted to the requirements of the geometry of the public area 3, wherein care should be taken that the surface areas between the individual grid points remain the same size over the entire public area 3, whereby a relatively uniform distribution of the sound pressure level is obtained over the entire public area 3.

In a non-limiting embodiment of variant 1 or one of the above variants, the vectors resulting from the difference of the coordinates of the grid point associated to the respective sound transducer 9 in the plane of the two-dimensional sound transducer arrangement 1 to the respective position of the associated coordinate point in the public area 3 are attributed to components of the unit vector $\hat{d}$ in order to create a mathematical basis for the determination of the time differences between adjacent sound transducers.

In principle, it is not necessary that physical sound transducers 9 are associated to all crossing points of the auxiliary grid, which emit the same frequency range. As a result it is possible for example to interrupt the equipment in those areas in which low midrange sound transducers 9 have their sound outlet opening or to place tweeters in front of the low midrange sound transducers, wherein the runtime differences due to the mechanical offset are compensated by interpolation at the crossing points of the auxiliary grid.

In a non-limiting embodiment of the variants described above, the influence of the angle included by the synthesized wavefront at a given grid point to the plane of the sound transducer arrangement 1 on the signal level perceived at the associated point in the public area 3 is compensated by the fact that the level of the sound transducer associated to the respective point is compensated with the cosine function of the respective angle, wherein the value of this cosine function corresponds to the value of the component $\widehat{d_n}$ of the unit vector $\hat{d}$.

In principle, several auxiliary grids in the public area, each with the same number of points as the grid in the plane of the two-dimensional sound transducer arrangement 1, can also be associated to the crossing points of the planar or curved grid in the plane of the two-dimensional sound transducer arrangement 1, whereby partial areas within the public surface for example can simultaneously be supplied with a different signal content.

The reference points in the public area 3 can be distributed more closely with increasing distance from the two-dimensional sound transducer arrangement 1, for example with the intention to make the areas between the reference points smaller with increasing distance from the two-dimensional sound transducer arrangement 1, so that the associated sound transducers 9 of the two-dimensional sound transducer arrangement 1 can be actuated with less level at an unchanged sound pressure in the respective area, whereby more headroom is available for the compensation of the drop in treble due to the airborne sound insulation in these areas.

The influence of the airborne sound insulation on the signal at the spectator seat for the individual sound transducers 9 can be compensated by the fact that their respective input signal can be compensated with the inverse equalization of the influence of the airborne sound insulation at a given air humidity corresponding to the distance $\|d\|$ of the associated vector.

In principle, individual public areas 3 can be excluded from the supply, for example temporarily. For example, when they are not occupied during an event, which improves the direct sound fraction in the remaining public area 3.

In a device for filling a given public area 3 with sound, the runtimes with which the individual sound transducers 9 of the two-dimensional sound transducer arrangement 1 emit according to one of the above-described method variants are not realized by an electronic delay of the signal content, but by the mechanical positioning of the sound transducers, which are actuated with coherent signals, wherein the signal levels for the respective sound transducer 9 correspond to the values determined for the original crossing points of the grid.

The invention claimed is:

1. A method for filling at least one public area with sound by at least one sound transducer arrangement with a plurality of sound transducers, wherein individual sound transducers of the at least one sound transducer arrangement each emit elementary waves, which are superimposed to form a common wavefront, wherein:

a) the at least one sound transducer arrangement and the at least one public area are geometrically combined with each other by a coordinate system, b) a spatial allocation exists between physical positions of the individual sound transducers and position vectors $s_i$ for defining coordinates in an area of the at least one sound transducer arrangement, c) an allocation of points of the coordinate system to points in the at least one public area exists corresponding to a position vector $r_i$, d) direction vectors are obtained in the coordinate system, e) in dependence on the spatial allocation of the position vectors $s_i$ and the individual sound transducers, delay times $\tau_j$ are determined for the individual sound transducers, with which the elementary waves are emitted by the individual sound transducers, and f) the delay times $\tau_j$ of the individual sound transducers each are chosen such that a local direction of the common wavefront corresponds to a direction of the direction vectors, and wherein a normal n to a reference surface S of the at least one sound transducer arrangement at a point described by s=s(u, v), parameterized by means of [x(u,v) y(u, v) z(u, v)], wherein u and v are real, continuous variables, is given by a cross product of $s_u$ and $s_v$ as $n=s_u \times s_v$, wherein $s_u$ and $s_v$ are given by partial derivatives $$s_u = \frac{\partial s}{\partial u} = \left[\frac{\partial x}{\partial u}\frac{\partial y}{\partial u}\frac{\partial z}{\partial u}\right] \text{ or}$$

$$s_v = \frac{\partial s}{\partial v} = \left[\frac{\partial x}{\partial v}\frac{\partial y}{\partial v}\frac{\partial z}{\partial v}\right],$$

wherein, for determining respective delay times $\tau_j$ a scalar-valued function of delay times $\tau(u, v)$ initially is determined for a finite quantity of position vectors of form s=s(u, v) and the determination of the delay times $\tau_j$ for the individual sound transducers with the position vectors $s_i$ at least partly is affected by interpolation of at least two values each of form $\tau(u, v)$, characterized in that the delay times $\tau(u, v)$ are determined by means of numerical integration of a discrete 2D vector field $[\Delta_u\tau\ \Delta_v\tau]$, wherein delay differences $\Delta_u\tau$ in u-direction or $\Delta_v\tau$ in v-direction are given by:

$$\Delta_u \tau = \frac{\hat{d}_u}{c}\Delta u \text{ or}$$

$$\Delta_v \tau = \frac{\hat{d}_v}{c}\Delta v,$$

and wherein Δu and Δv each describe discrete step widths in u direction or in v direction, c describes sound velocity, and wherein $\hat{d}_u$ and $\hat{d}_v$ are given by scalar products:

$$\hat{d}_u = \hat{d}\cdot s_u \text{ or}$$

$$\hat{d}_v = \hat{d}\cdot s_v,$$

wherein $\hat{d}$ each describes a normalized direction vector proceeding from position vector s=s(u, v) and $s_u$ and $s_v$ describe tangent vectors to the reference surface S proceeding from the position vector s=s(u, v) and tangent vectors $s_u$ and $s_v$ are given by the partial derivatives:

$$s_u = \frac{\partial s}{\partial u} = \left[\frac{\partial x}{\partial u}\frac{\partial y}{\partial u}\frac{\partial z}{\partial u}\right] \text{ or}$$

$$s_v = \frac{\partial s}{\partial v} = \left[\frac{\partial x}{\partial v}\frac{\partial y}{\partial v}\frac{\partial z}{\partial v}\right];$$

wherein an operation of the individual sound transducers with the delay times $\tau_j$ is controlled by an actuation by means of a computer system and/or mechanically, in particular by spatial offset of the individual sound transducers relative to each other.

2. The method according to claim 1, wherein at least one of the following:

the individual sound transducers are arranged in or on a plane or in or on an at least partly curved or planar surface, wherein a position of acoustic centers of the individual sound transducers can deviate from crossing points of an auxiliary grid, as far as related change of delay time and level is corrected by spatial interpolation or other methods, the individual sound transducers are arranged in a three-dimensional area, such that at least a partial quantity of the individual sound transducers is arranged on a reference surface and positions of remaining sound transducers can be determined by an offset into the three-dimensional area, or any combination thereof.

3. The method according to claim 1, wherein the operation of the individual sound transducers with the delay times $\tau_j$ is controlled by the actuation by means of the computer system or mechanically.

4. The method according to claim 1, wherein at least one of:

the at least one public area at least partly has a concave shape and/or at least partly a convex shape, the at least one public area can be described as a coherent surface, the at least one public area can be described as an incoherent surface, which is composed of at least two coherent surfaces;

or any combination thereof.

5. The method according to claim 1, wherein at least one of:

the position vectors $s_i$ provide a regular grid, the position vector $r_i$ provides a regular grid on a surface associated to the at least one public area, or any combination thereof.

6. The method according to claim 1, wherein the allocation which to each position vector $s_i$ allocates the point in the at least one public area corresponding to the position vector $r_i$ can be determined by means of connecting lines from the at least one sound transducer arrangement into the at least one public area.

7. The method according to claim 1, wherein levels with which the individual sound transducers are operated and adapted such that sound pressure in the at least one public area is homogeneous.

8. The method according to claim 7, wherein the levels with which the individual sound transducers of the at least one sound transducer arrangement are operated can be determined by means of a relative amplification factor, based on the rule $\hat{d}_n=\hat{d}_i\cdot n_i$, wherein $n_i$ each describes the normal to the reference surface S at the position vectors $s_i$ which is associated to the individual sound transducers.

9. The method according to claim 1, wherein the at least one public area includes at least two partial areas filled with the sound with a different signal content.

10. The method according to claim 1, wherein the common wavefront is shaped such that it is adapted to a geometry of the at least one public area, in that an allocation of grid points is effected and the common wavefront then is shaped such that substantially the same number of individual sound transducers is associated to equally large partial areas of the at least one public area.

11. The method according to claim 1, wherein partial areas of the at least one public area and partial areas of the at least one sound transducer arrangement are allocated, to which a different audio content can simultaneously be associated, wherein a directivity of the at least one sound transducer arrangement is utilized to align signal contents with predetermined parts of the at least one public area, wherein in each of the partial areas a number of crossing points then corresponds to a number of crossing points of an auxiliary grid of the at least one sound transducer arrangement.

12. A method for determining delay times $\tau_j$ for operating sound transducers of at least one sound transducer arrangement with a plurality of sound transducers j for generating elementary waves according to the delay times $\tau_j$ for filling at least one public area with sound, comprising:

determining a coordinate system, by which the at least one sound transducer arrangement is approximately described as a two-dimensional reference surface S of the at least one sound transducer arrangement, and the at least one public area is approximately described, determining position vectors s on the two-dimensional reference surface S of the at least one sound transducer arrangement, from which positions of the sound transducers of the at least one sound transducer arrangement can be determined, determining an allocation which to each position vector s on the two-dimensional reference surface S of the at least one sound transducer arrangement allocates a position vector r corresponding to a point in the at least one public area, determining direction vectors, in particular normalized direction vectors $\hat{d}$ proceeding from the position vectors s, wherein the normalized direction vectors $\hat{d}$ proceeding from the position vectors s each point in a direction of the position vector r associated to the position vectors s; and determining the delay times $\tau_j$ for the plurality of sound transducers j so that in operation according to the delay times $\tau_j$, the elementary waves generated by the sound transducers are superimposed to form a common wavefront, wherein the normalized direction vectors $\hat{d}$ each describe local propagation directions of the common wavefront, wherein a normal n to the two-dimensional reference surface S of the at least one sound transducer arrangement at the point described by s=s(u, v) is given by a cross product of $s_u$ and $s_v$ as $n=s_u \times s_v$, wherein $s_u$ and $s_v$ are given by partial derivatives:

$$s_u = \frac{\partial s}{\partial u} = \left[\frac{\partial x}{\partial u}\frac{\partial y}{\partial u}\frac{\partial z}{\partial u}\right] \text{ or}$$

$$s_v = \frac{\partial s}{\partial v} = \left[\frac{\partial x}{\partial v}\frac{\partial y}{\partial v}\frac{\partial z}{\partial v}\right],$$

wherein for determining respective delay times $\tau_j$ a scalar-valued function of delay times τ(u, v) initially is determined for a finite quantity of position vectors of form s=s (u, v) and the determination of the delay times t; for the sound transducers with position vector $s_i$ at least partly is affected by interpolation of at least two values each of form τ(u, v), wherein the delay times τ(u, v) are determined by means of numerical integration of a discrete 2D vector field $[\Delta_u\tau\ \Delta_u\tau]$, wherein delay differences $\Delta_u\tau$ in u-direction or $\Delta_u\tau$ in v-direction are given by:

$$\Delta_u\tau = \frac{\hat{d}_u}{c}\Delta u \text{ or}$$

$$\Delta_v\tau = \frac{\hat{d}_u}{c}\Delta v,$$

and wherein Δu and Δv each describe discrete step widths in u direction or in v direction, c describes sound velocity, and wherein $\hat{d}_u$ and $\hat{d}_v$ are given by scalar products:

$$\hat{d}_u = \hat{d}\cdot s_u \text{ or}$$

$$\hat{d}_v = \hat{d}\cdot s_v,$$

wherein $\hat{d}$ each describes normalized direction vector proceeding from the position vector s=s(u, v) and $s_u$ and $s_v$ describe tangent vectors to the two-dimensional reference surface S proceeding from the position vector s=s(u, v) and tangent vectors $s_u$ and $s_v$ are given by the partial derivatives:

$$s_u = \frac{\partial s}{\partial u} = \left[\frac{\partial x}{\partial u}\frac{\partial y}{\partial u}\frac{\partial z}{\partial u}\right] \text{ or}$$

$$s_v = \frac{\partial s}{\partial v} = \left[\frac{\partial x}{\partial v}\frac{\partial y}{\partial v}\frac{\partial z}{\partial v}\right].$$

13. The method according to claim 12, further comprising a determination of relative amplification factors $\hat{d}_n$ for at least a partial quantity of the position vectors s according to the rule:

$$\hat{d}_n=\hat{d}\cdot n,$$

wherein n is a normal to the two-dimensional reference surface S of the sound transducer arrangement at the point determined by the position vectors s and $\hat{d}$ is the normalized direction vector proceeding from the position vectors s.

14. The method according to claim 12, wherein the position vectors s describe the positions of the sound transducers.

15. The method according to claim 12, wherein to each position vector s on the two-dimensional reference surface S of the at least one sound transducer arrangement a position vector r on a reference surface R of the at least one public area is associated and the determination of the direction vectors is effected by means of a connecting line between the position vectors s and the position vector r.

16. The method according to claim 15, wherein the connecting line for determining the normalized direction vectors $\hat{d}$ each do not cross or intersect each other in pairs.

17. The method according to claim 15, wherein the position vector r is uniformly distributed on the reference surface R of the at least one public area and thereby corresponds to uniformly distributed points in the at least one public area.

18. The method according to claim 12, wherein the allocation between the position vectors s and the position vector r is affected automatically.

19. The method according to claim 12, wherein the reference surface R of the at least one public area is described by an auxiliary grid on which the position vector r at least partly is crossing points.

20. The method according to claim 12, wherein at least one of:

the two-dimensional reference surface S of the at least one sound transducer arrangement is described by an auxiliary grid on which the position vectors s at least partly are crossing points, the two-dimensional reference surface S of the at least one sound transducer an arrangement is parameterized by means of coordinates s(u, v)=[x(u,v) y(u,v) z(u,v)], wherein u and v are real, continuous variables or discrete variables and thus in particular the position vectors s can be described in the form s=s(u, v), or any combination thereof.

21. The method according to claim 12, wherein:

the two-dimensional reference surface S of the at least one sound transducer arrangement is parameterized by means of coordinates s(u, v)=[x(u, v) y(u, v) z(u, v)], wherein u and v are real, continuous variables or discrete variables and thus the position vectors s can be described in the form s=s(u, v), and the normal n to the two-dimensional reference surface S of the sound transducer arrangement at the point described by the s=s(u, v) is given by the cross product of $s_u$ and $s_v$ as $n=s_u \times s_v$, wherein $s_u$ and $s_v$ are given by the partial derivatives:

$$s_u = \frac{\partial s}{\partial u} = \left[\frac{\partial x}{\partial u}\frac{\partial y}{\partial u}\frac{\partial z}{\partial u}\right] \text{ or}$$

$$s_u = \frac{\partial s}{\partial v} = \left[\frac{\partial x}{\partial v}\frac{\partial y}{\partial v}\frac{\partial z}{\partial v}\right].$$

22. The method according to claim 21, wherein the scalar-valued function of the delay times τ(u, v) is determined by the means of numerical integration of the discrete 2D vector field $[\Delta_u\tau\ \Delta_v\tau]$, wherein delay differences $\Delta_u\tau$ in u-direction or $\Delta_v\tau$ in v-direction are given by:

$$\Delta_u\tau = \frac{\hat{d}_u}{c}\Delta u \text{ or}$$

$$\Delta_v\tau = \frac{\hat{d}_v}{c}\Delta v$$

wherein Δu and Δv each describe discrete step widths in u direction or in v direction, wherein c describes the sound velocity, and wherein $\hat{d}_u$ and $\hat{d}_v$ are given by the scalar products:

$$\hat{d}_u = \hat{d}\cdot s_u$$

$$\hat{d}_v = \hat{d}\cdot s_v,$$

wherein $\hat{d}$ each describes the normalized direction vector proceeding from the position vector s=s(u, v) and $s_u$ and $s_v$ describe tangent vectors to the two-dimensional reference surface S proceeding from the position vector s=s(u, v), in particular wherein $s_u$ and $s_v$ are given by the partial derivatives:

$$s_u = \frac{\partial s}{\partial u} = \left[\frac{\partial x}{\partial u}\frac{\partial y}{\partial u}\frac{\partial z}{\partial u}\right] \text{ or}$$

$$s_u = \frac{\partial s}{\partial v} = \left[\frac{\partial x}{\partial v}\frac{\partial y}{\partial v}\frac{\partial z}{\partial v}\right].$$

23. The method according to claim 21, wherein the numerical integration comprises at least one of the following: the Composite Trapezium method, the Simpson method, the Romberg method, the more advanced inverse gradient method, or any combination thereof.

24. A computer program product comprising a non-transitory computer-readable storage medium executable by a processor for determining delay times $\tau_j$ for operating sound transducers of at least one sound transducer arrangement with a plurality of sound transducers j for generating elementary waves according to the delay times $\tau_i$ for filling at least one public area with sound, wherein the computer program product contains or uses means for executing at least one instruction for determining the delay times $\tau_j$ for the plurality of sound transducers j according to claim 1.

25. A device for filling at least one public area with sound, which comprises at least one sound transducer arrangement with a plurality of sound transducers, wherein the at least one sound transducer arrangement can be operated by a method according to claim 1.

26. The device according to claim 25, wherein the at least one sound transducer arrangement and the at least one public area are geometrically linked with each other by a coordinate system and between physical positions of individual sound transducers in the at least one sound transducer arrangement and position vectors $s_i$ for defining coordinates in an area of the at least one sound transducer arrangement a spatial allocation exists, and furthermore an allocation of points of the coordinate system to points in the at least one public area exists corresponding to a position vector $r_i$, wherein direction vectors are obtained in the coordinate system, the device further comprising:

means for controlling sound emission of the individual sound transducers, which in dependence on the spatial allocation of the position vectors $s_i$ to the individual sound transducers determines delay times $\tau_i$ for the individual sound transducers, by means of which elementary waves are emitted by the individual sound transducers, wherein the delay times $\tau_j$ of the individual sound transducers each are chosen such that local direction of common wavefront corresponds to a direction of a direction vector, means for allocating each sound transducer to a point in the at least one public area corresponding to the position vector $r_i$, so that normalized direction vectors $$\hat{d}_i = \frac{r_i - s_i}{|r_i - s_i|}$$

are obtained, and means for determining the delay times $\tau_j$ of the individual sound transducers such that the local direction of the common wavefront corresponds to a direction of a normalized direction vector $\hat{d}_i$, wherein the individual sound transducers each emit the elementary waves, which are superimposed to form the common wavefront, and the at least one sound transducer arrangement and the at least one public area are associated to a common coordinate system in which positions of the individual sound transducers and the individual sound transducers can each be operated with the delay times $\tau_j$ for emitting the elementary waves.

27. The device according to claim 25, wherein different runtimes for the individual sound transducers are realized by using a mechanical or geometrical positioning of the individual sound transducers, which are actuated with coherent signals, wherein signal levels for a respective sound transducer can correspond to values determined for original crossing points of a grid.

28. A computer program product comprising a non-transitory computer-readable storage medium executable by a processor for determining delay times $\tau_j$ for operating sound transducers of at least one sound transducer arrangement with a plurality of sound transducers j for generating elementary waves according to the delay times $\tau_i$ for filling at least one public area with sound, wherein the computer program product comtains or uses means for executing at least one instruction for determining the delay times $\tau_j$ for the plurality of sound transducers j according to claim 12.

* * * * *